US010538391B2

(12) United States Patent
Bratton

(10) Patent No.: US 10,538,391 B2
(45) Date of Patent: Jan. 21, 2020

(54) CONVEYOR DRIVE ASSEMBLY

(71) Applicant: TEREX GB LIMITED, County Tyrone (GB)

(72) Inventor: Terence Bratton, County Tyrone (GB)

(73) Assignee: TEREX BG LIMITED (GB)

( * ) Notice: Subject to any disclaimer, the term of this patent is extended or adjusted under 35 U.S.C. 154(b) by 0 days.

(21) Appl. No.: 15/989,420

(22) Filed: May 25, 2018

(65) Prior Publication Data

US 2018/0339861 A1    Nov. 29, 2018

(30) Foreign Application Priority Data

May 26, 2017    (GB) .................................. 1708506.9

(51) Int. Cl.
| | | |
|---|---|---|
| *B65G 21/14* | (2006.01) | |
| *B65G 41/00* | (2006.01) | |
| *B65G 15/12* | (2006.01) | |
| *B65G 21/12* | (2006.01) | |

(52) U.S. Cl.
CPC .......... *B65G 21/14* (2013.01); *B65G 41/002* (2013.01); *B65G 15/12* (2013.01); *B65G 21/12* (2013.01); *B65G 41/001* (2013.01); *B65G 41/008* (2013.01)

(58) Field of Classification Search
CPC ...... B65G 21/06; B65G 41/003; B65G 15/26; B65G 41/002; B65G 21/14; B65G 41/008; B65G 15/12; B65G 41/001; B65G 21/12
USPC .................................................. 198/588, 812
See application file for complete search history.

(56) References Cited

U.S. PATENT DOCUMENTS

| | | | | |
|---|---|---|---|---|
| 2,632,556 A | | 3/1953 | Alpers et al. | |
| 3,572,695 A | * | 3/1971 | Janirek ................. | B65G 21/14 271/191 |
| 4,008,797 A | | 2/1977 | Nelson et al. | |
| 4,245,732 A | * | 1/1981 | Couperus ............... | B65G 21/14 198/313 |
| 5,190,352 A | * | 3/1993 | LeBegue ................ | E21C 27/24 198/587 |

(Continued)

FOREIGN PATENT DOCUMENTS

| | | |
|---|---|---|
| CA | 2223202 A1 | 5/1999 |
| CA | 2741539 A1 | 11/2012 |

(Continued)

OTHER PUBLICATIONS

Combined Search and Examination Report for corresponding GB application No. 1708506.9, dated Nov. 24, 2017.

(Continued)

*Primary Examiner* — Mark A Deuble
(74) *Attorney, Agent, or Firm* — Tarolli, Sundheim, Covell & Tummino LLP

(57) ABSTRACT

A conveyor apparatus comprising a base frame and an extendable frame, where the extendable frame is supported within the base frame and a drive assembly. The drive assembly comprises a rotatable drive mechanism which has a plurality of frame engaging portions which are arranged to engage with a plurality of drive engaging portions disposed upon a first one of the base or extendable frames such that when the drive mechanism rotates, the drive assembly is configured to displace the first one of the base or extendable frames with respect to the first between an extended state and a retracted state.

19 Claims, 29 Drawing Sheets

(56) References Cited

U.S. PATENT DOCUMENTS

| | | | | |
|---|---|---|---|---|
| 6,298,981 B1 * | 10/2001 | Hosch | ................... | B65G 23/44 |
| | | | | 198/812 |
| 6,481,566 B1 * | 11/2002 | Horak | ................... | B65G 21/08 |
| | | | | 198/595 |
| 7,322,462 B2 * | 1/2008 | Landry | ................. | B65G 23/44 |
| | | | | 198/812 |
| 7,448,486 B1 | 11/2008 | Frankl et al. | | |
| 8,381,900 B1 * | 2/2013 | Hoogestraat | ........... | B65G 33/14 |
| | | | | 198/588 |
| 8,955,667 B1 * | 2/2015 | Dibble | ................ | B65G 67/606 |
| | | | | 198/594 |
| 2004/0112719 A1 * | 6/2004 | Gilmore | .............. | A61K 9/0019 |
| | | | | 198/812 |
| 2014/0262689 A1 * | 9/2014 | Kim | ...................... | B65G 15/26 |
| | | | | 198/594 |

FOREIGN PATENT DOCUMENTS

| | | | |
|---|---|---|---|
| CH | 6964342 A5 | 8/1984 | |
| CH | 664342 A5 * | 2/1988 | ............ B65G 21/14 |
| CN | 104891103 A | 9/2015 | |
| CN | 204823276 U | 12/2015 | |
| CN | 204847143 U | 12/2015 | |
| CN | 205820173 U | 12/2016 | |
| GB | 1360798 A | 7/1974 | |
| JP | S06151402 A | 3/1986 | |
| JP | S6212508 A | 1/1987 | |
| SU | 486978 A1 | 10/1975 | |

OTHER PUBLICATIONS

European Search Report corresponding to European Application No. 18 17 3930 dated Apr. 3, 2019.

* cited by examiner

CONVEYOR DRIVE ASSEMBLY

RELATED APPLICATIONS

The present invention is a U.S. non-provisional patent application, claiming priority to GB 1708506.9, filed on 26 May 2017, the entirety of which is incorporated herein by reference.

FIELD OF THE INVENTION

This invention relates to drive assemblies and in particular to conveyor drive assemblies for telescopic conveyors.

BACKGROUND TO THE INVENTION

Telescopic conveyors are commonly used to transport loose bulk materials such as aggregate from one location to another using a conveyor belt arrangement mounted on a frame structure. Some telescopic conveyors operate in such a way that they may be lowered and raised as well as being capable of forward, reverse and radial movement. This capability provides that the conveyor is able to stock piles of aggregate material uniformly upon the ground within a given area. Such conveyors are typically used in mining areas for loading mined materials into bulk carriers. Telescopic conveyors are relatively large structures, which are transported in a number of sections which are then assembled together on site. The fastening arrangement between the various sections typically comprises bolts, however using these to fasten the plurality of sections making up the base frame and/or extendable frame can be cumbersome and time consuming.

A typical telescopic conveyor comprises two or more conveyor sections, which are configured to extend and retract with respect to one another in telescopic fashion. For example, a telescopic conveyor typically comprises an outer base frame from within which a second, extendable frame is configured to extend out of and retract into. This movement is typically effected by a drive mechanism such as a winch and wire rope system. However such arrangements can be time consuming to install and offer less than optimum control of the extendable frame when it is extending out of or retracting into the outer base frame. Furthermore it is not unknown for such rope systems to deteriorate after a period of time and to such an extent that the rope breaks or is otherwise damaged beyond usability.

It is therefore a desire of the present invention to provide an improved drive assembly for a telescopic conveyor.

SUMMARY OF THE INVENTION

Accordingly a first aspect of the present invention provides a conveyor apparatus comprising a base frame and an extendable frame, wherein the extendable frame is supported within the base frame, a drive assembly wherein the drive assembly comprises a rotatable drive mechanism having a plurality of frame engaging portions which are arranged to engage with a plurality of drive engaging portions disposed upon a first one of the base or extendable frames such that when the drive mechanism rotates, the drive assembly is configured to displace the first one of the base or extendable frames with respect to the second between an extended state and a retracted state.

Preferably, the drive engaging portions are disposed in a linear arrangement along at least a portion of the length of the first frame such as to define a continuous arrangement of drive engaging portions. Ideally, the drive engaging portions are disposed upon the extendable frame. Preferably, the drive engaging portions are disposed upon the underside of the extendable frame. Ideally, the drive engaging portions define a plurality of spaced apart recesses. Preferably, the drive engaging portions comprise a plurality of pins or bars or slots. Ideally, the drive engaging portions comprise a plurality of teeth. Preferably, the drive engaging portions comprise a chain.

Preferably, the frame engaging portions are spaced apart around or towards the periphery of the drive mechanism. Ideally, the drive mechanism comprises first and second sprockets which are disposed in a spaced apart arrangement, which are connected by the frame engaging portions which extend between the sprockets and wherein the spaced apart arrangement of the sprockets define a gap therebetween which is suitable for receiving one or more of the drive engaging portions. Preferably, the frame engaging portions comprise a plurality of pins or bars or any other suitable elongate member. Ideally, the frame engaging portions comprise a plurality of protrusions such that the drive mechanism defines a sprocket.

Preferably, the conveyor apparatus comprises first and second drive assemblies arranged at opposing sides of the base frame. Ideally, the conveyor apparatus comprises first and second arrangements of drive engaging portions disposed at opposing sides of the base frame, the first and second arrangements of drive engaging portions arranged to engage with respective first and second drive assemblies.

Preferably, the base frame and/or extendable frame comprise a plurality of parts which are coupled together by a securing arrangement. Ideally, the securing arrangement is configured such that when the plurality of parts of the frames are coupled together the joints between respective parts define a drive engaging portion such that where the parts are coupled, the coupled parts define a continuous arrangement of drive engaging portions. Ideally, the securing arrangement comprises at least two female portions disposed upon different parts of the frame, the female portion of one part being alignable with the female portion of at least one other part such that when the female portions of two parts are aligned they are arranged to define an aperture into which a male member is insertable such as to couple the two parts of the frame together. Preferably, the two parts are coupled together by the securing arrangement, the coupled female portions are configured to define a drive engaging portion which is alignable with the drive engaging portions disposed upon the parts such that when the plurality of parts are coupled together such as to define the frame, the parts and plurality of securing arrangements define drive engaging portions which extend in continuous fashion along opposing sides of the frame.

Ideally, the securing arrangement comprises a plurality of joining portions, wherein each joining portion is configured to be insertable into two parts of the frame with the same joining portion being insertable into both first and second parts of the frame at the same time. Preferably, the parts of the frame have openings disposed at their ends into which one joining portion is insertable into each opening in part such that when the joining portion is inserted into a first part of the frame the remainder of the joining portion is insertable into a second part of the frame. Ideally, the parts of the frame parts have primary apertures located on their lateral faces and the joining portions have secondary apertures located on their lateral faces such that when the joining portions are inserted into the parts the primary and secondary apertures of the parts and joining portions respectively are configured to align such that a male member can be inserted into the aligned apertures such as to secure the joining portion within the part with the remainder of the joining portion extending out of and away from the part for insertion in a respective other part of the frame for coupling the part and the respective other part together.

Preferably, the conveyor is a telescopic conveyor.

A second aspect of the invention provides a drive assembly for a conveyor apparatus having a base frame and an extendable frame, the extendable frame having a plurality of drive engaging portions disposed thereon, the drive assembly comprising a rotatable drive mechanism having a plurality of frame engaging portions which are arranged to engage with the plurality of drive engaging portions disposed upon the extendable frame such that when the drive mechanism rotates, the drive assembly is configured to displace the extendable frame with respect to the base frame between an extended state and a retracted state.

A third aspect of the invention provides a conveyor apparatus comprising a base frame and an extendable frame, wherein the extendable frame is supported by, and typically within, the base frame; and a drive assembly configured to displace the extendable frame with respect to the base frame between an extended state and a retracted state, wherein the extendable frame comprises a plurality of frame parts in an end-to-end arrangement, wherein at least two adjacent frame parts are pivotably coupled together for pivoting about a transverse axis that is perpendicular to a longitudinal axis of the extendable frame.

Preferably, at least two adjacent frame parts are pivotably coupled together to allow the adjacent frame parts to pivot relative to each other between a non-pivoted state in which the respective frame parts are longitudinally aligned with one another, and a pivoted state in which the respective longitudinal axis of the frame parts are obliquely disposed with respect to each other thereby causing the extendible frame to be non-linear in the longitudinal direction. Ideally, at least two adjacent frame parts are pivotably coupled together to allow the respective two coupled parts to pivot relative to one another in one mode, and to allow the two coupled parts to be fixed with respect to each other such that there is no pivoting between the two parts, in another mode. Preferably, at least two adjacent frame parts are pivotably coupled together by coupling means including one or more device for controlling and/or effecting movement of the respective frame parts between the pivoted and non-pivoted states.

Ideally, said one or more control device comprises any one or more of: one or more powered actuator; one or more spring; and/or one or more movement restrictor. Preferably, adjacent frame parts are coupled together by a plurality of securing arrangements. Ideally, the plurality of parts are configured to sequentially pivot relative to one another as the extendable frame displaces away from the base frame. Preferably the securing arrangements comprise a plurality of lower securing arrangements and upper securing arrangements. Ideally, the lower securing arrangements comprise a permanent coupling between the parts in-use and the upper securing arrangement comprise a releasable coupling between the parts. Preferably, the conveyor apparatus further comprising a plurality of actuators disposed between respective parts of the extendable frame.

Ideally, the actuators are configured to urge the parts of the extendable frame to pivot relative to one another about a pivot axis defined by the lower securing arrangements when the upper securing arrangement is released. Optionally, the actuators comprise resilient biasing means such as springs. Preferably, the actuators comprise powered actuators such as hydraulic, pneumatic or electrical actuators.

Ideally, the upper securing arrangement comprises a distance limiter configured to prevent the parts from pivoting relative to one another beyond a predetermined distance. Preferably, the distance limiter comprises a pin and slot arrangement or one or more linkages or arms or any other arrangement suitable for preventing the displacement of the parts beyond the predetermined distance from one another. Optionally, the upper securing arrangement is remotely releasable by wired or wireless electronic means.

Preferably, the upper securing arrangement comprises a powered actuator disposed between the parts and the lower securing arrangement comprises a permanent coupling between the parts in-use. Ideally, the powered actuator is movable between retracted and extended states, wherein in the extended state the parts are configured to pivot relative to one another to move the extendable frame between straight and cambered configurations.

Ideally, the parts are coupled by four securing arrangements comprising two upper securing arrangements and two lower securing arrangements. Alternatively, the parts may be coupled by a singular lower securing arrangement and two upper securing arrangements. Ideally, the securing arrangements are located at or towards the respective upper and lower end corners of the parts. Optionally, the drive assembly comprises a rotatable drive mechanism having a plurality of frame engaging portions which are arranged to engage with a plurality of drive engaging portions disposed upon the extendable frame.

BRIEF DESCRIPTION OF THE DRAWINGS

Embodiments of the invention will now be described by way of example with reference to the accompanying drawings in which like numerals are used to denote like parts and in which.

DETAILED DESCRIPTION

Figure 1:
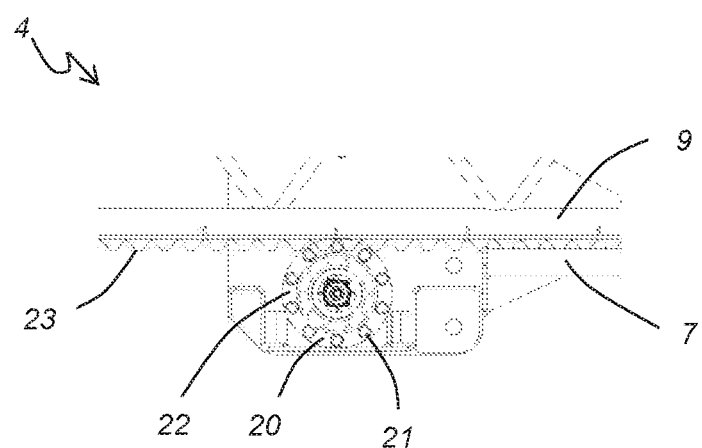
FIG. 1 is a side sectional view of a conveyor apparatus embodying a first aspect of the invention showing a first embodiment of a drive mechanism of the conveyor apparatus.
Figure 2:
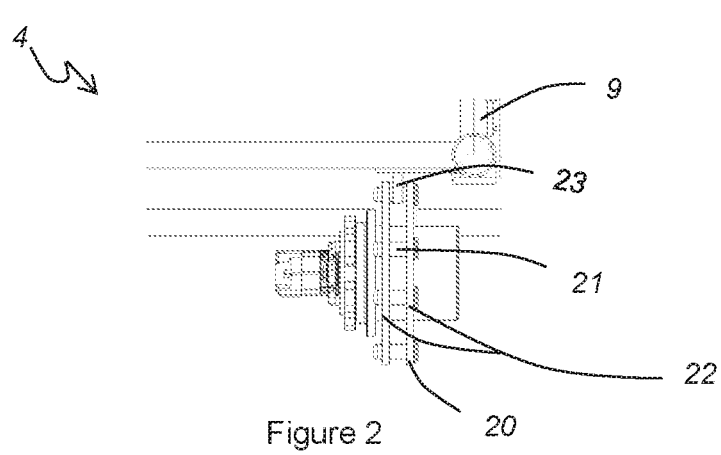
FIG. 2 is a front sectional view of the conveyor apparatus showing the first embodiment of the drive mechanism of the conveyor apparatus.
Figure 3:
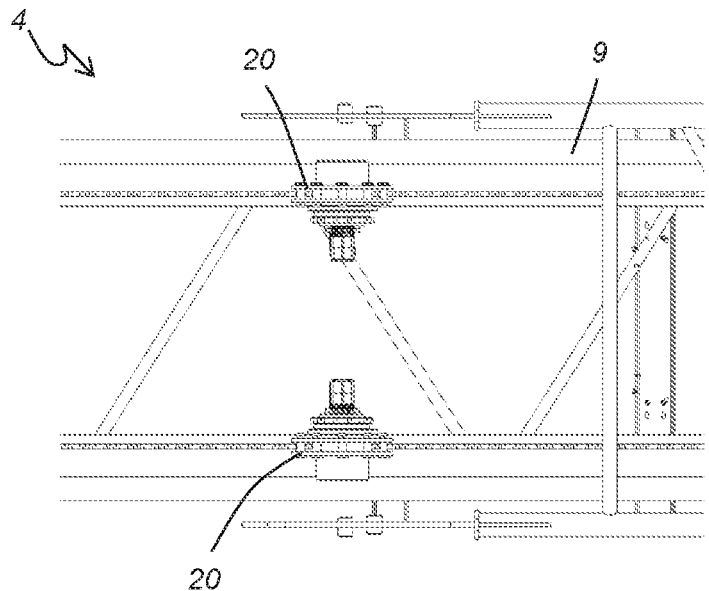
FIG. 3 is top plan view of the conveyor apparatus showing the first embodiment of the drive mechanism of the conveyor apparatus.
Figure 4:
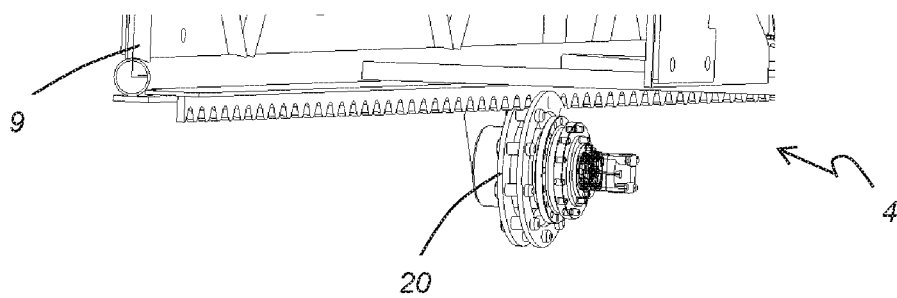
FIG. 4 is a front perspective view of the conveyor apparatus showing the first embodiment of the drive mechanism of the conveyor apparatus.
Figure 5:
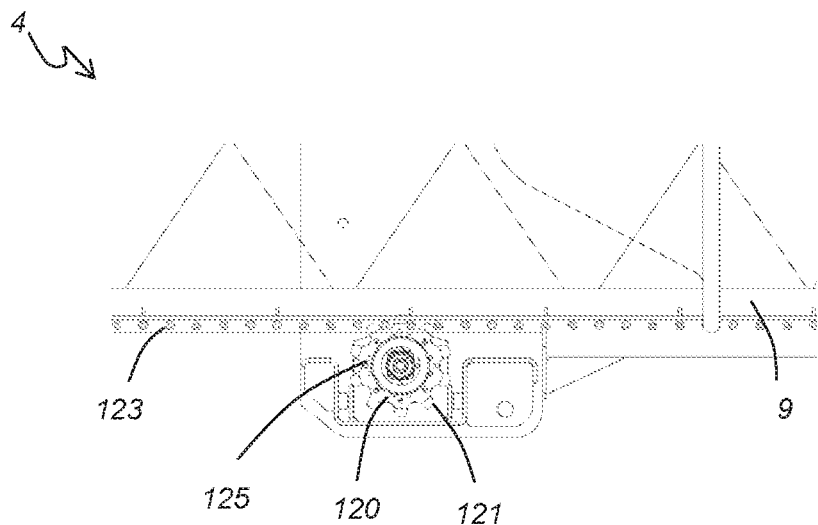
FIG. 5 is side sectional view of the conveyor apparatus showing a second embodiment of the drive mechanism of the conveyor apparatus.
Figure 6:
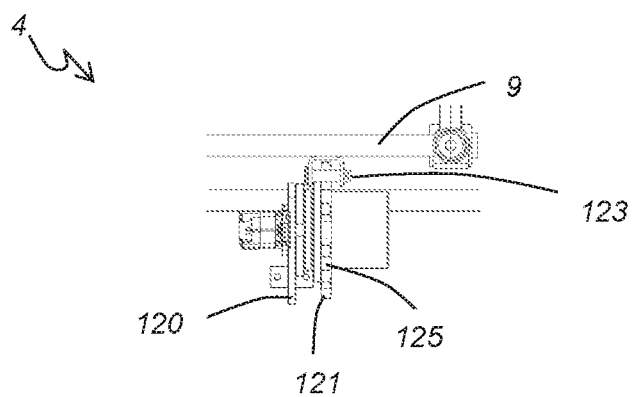
FIG. 6 is a front sectional view of the conveyor apparatus showing the second embodiment of the mechanism of the conveyor apparatus.
Figure 7:
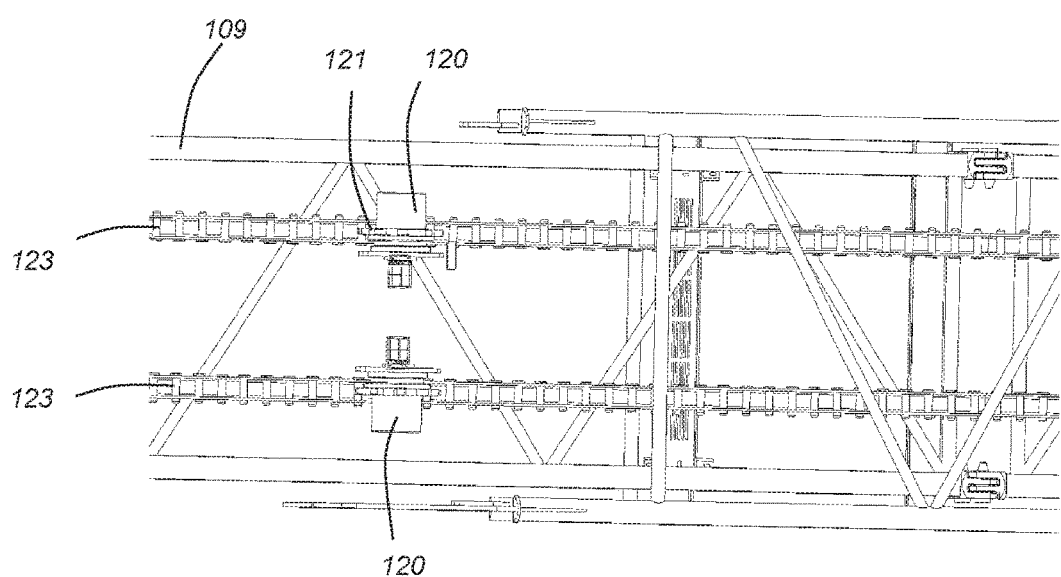
FIG. 7 is a bottom plan view of the conveyor apparatus showing the second embodiment of the drive mechanism of the conveyor apparatus.
Figure 8:
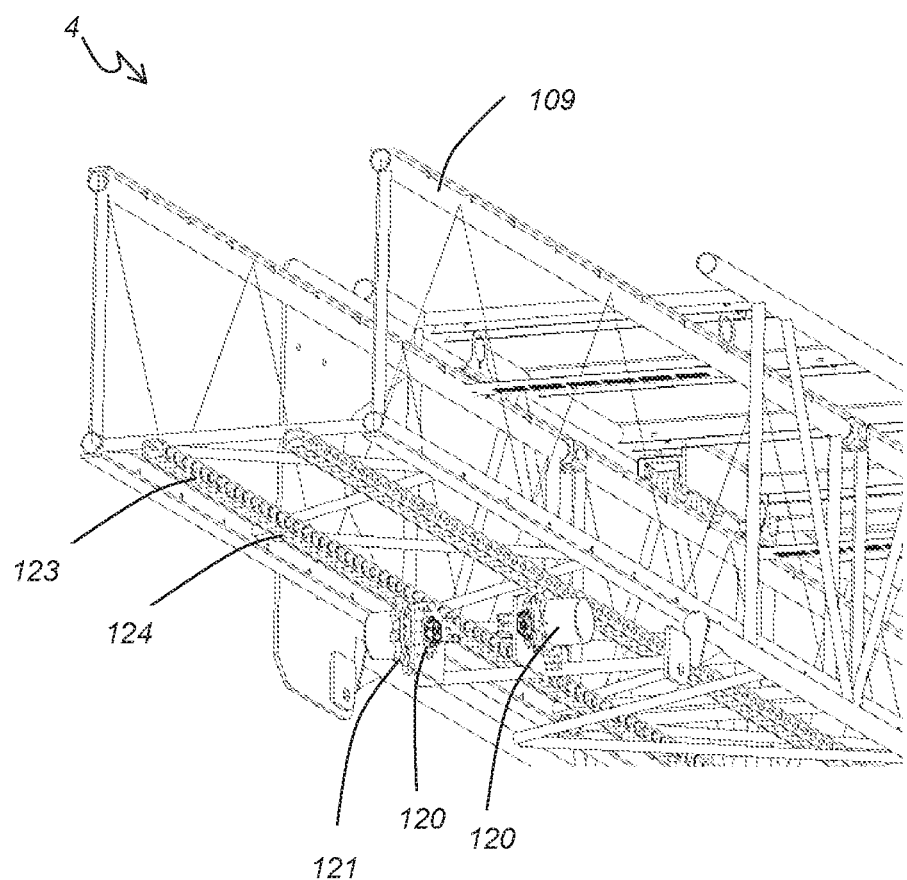
FIG. 8 is a front perspective view of the conveyor apparatus showing the second embodiment of the drive mechanism of the conveyor apparatus.
Figure 9:
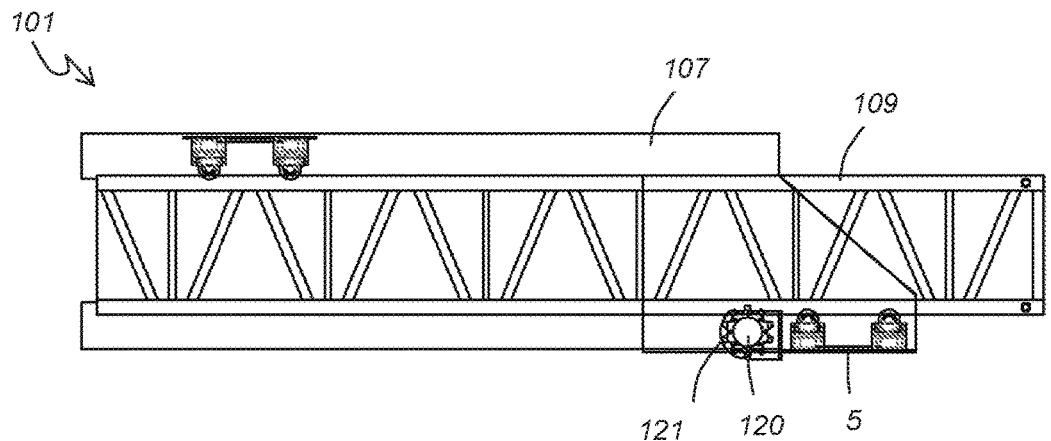
FIG. 9 is a side sectional view of the conveyor apparatus showing the second embodiment of the drive mechanism of the conveyor apparatus.
Figure 10:
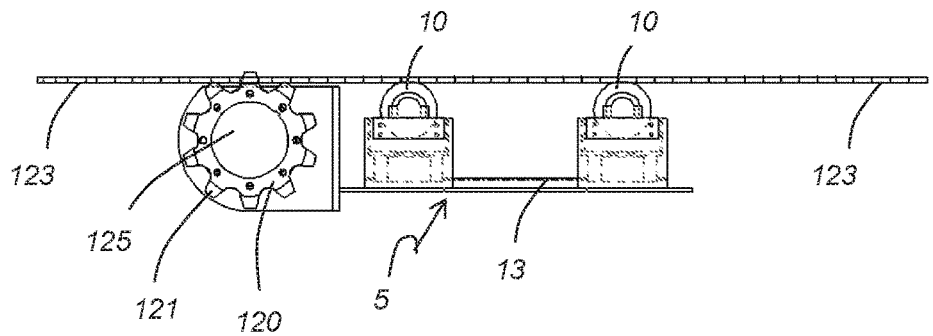
FIG. 10 is a side sectional view of the conveyor apparatus showing the second embodiment of the drive mechanism of the conveyor apparatus.
Figure 11:
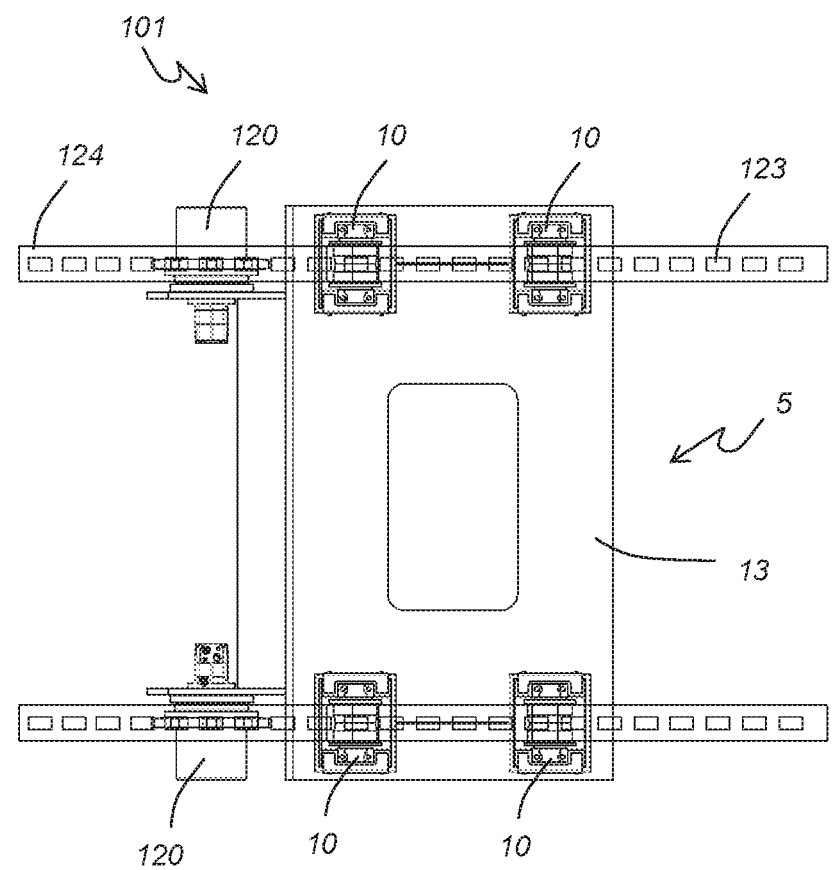
FIG. 11 is a top plan view of the third embodiment of the drive assembly of the conveyor apparatus.

Referring now to the drawings there is shown, generally indicated by reference numeral 1 a conveyor apparatus. The conveyor apparatus 1 is configured to receive, carry and displace aggregate or other material and to this end the conveyor 1 includes one or more belt conveyors (not shown). Typically, the conveyor apparatus 1 is mobile and comprises one or more wheels 2 and/or tracks mounted on a chassis 3. The conveyor apparatus 1 is usually towable. The conveyor apparatus 1 may be referred to as a telescopic conveyor.

It should be understood that for reasons of clarity, in the accompanying drawings, only those elements of the conveyer apparatus 1 necessary for understanding the invention have been shown. Furthermore in the following description, it is assumed that the term "vertical" is intended to mean perpendicular to the surface on which the conveyor 1 is located in use.

The conveyor apparatus 1 typically comprises a base frame 7 and an extendable frame 9, wherein the extendable frame 9 is supported by, and typically within, the base frame 7. To this end the base frame 7 is suitably shaped and dimensioned to receive the extendable frame 9. The extendable frame 9 is preferably telescopically mounted within the base frame 7 such that the extendable frame 9 is moveable with respect to the base frame 7 between an extended state and a retracted state and a plurality of intermediary extended/retracted states therebetween. The extendable frame 9 extends from the base frame 7 in cantilever fashion in-use. It will be apparent that there are other ways in which the frames can be telescopically arranged. In use, the frames carry one or more conveyor belts and associated components, e.g. conveyor rollers. These may be provided in any convenient conventional manner and are not shown for reasons of clarity.

The conveyor 1 includes a drive assembly 4 embodying a first aspect of the invention for moving the extendable frame 9 with respect to the base frame 7 or vice versa. The drive assembly may be provided on the base frame 7. However in an alternative embodiment (not shown) the drive assembly may be provided on the extendable frame 9. The extendable frame 9 has smaller dimensions than the base frame 7 such that the extendable frame 9 can be received within the base frame 7. Both the base frame 7 and extendable frame 9 may comprise a hollow lattice of interconnected support members 11, which are typically arranged such that the base frame 7 and extendable frame 9 have a substantially rectangular or square cross section. The term "forward" as used herein is to be understood as the direction in which the extendable frame 9 extends out of the base frame 7, with the term "rearward" being the opposing direction to "forward".

The extendable frame 9 may also be supported upon the base frame 7 by a first support assembly 5. The first support assembly 5 is located at a relatively forward position on the base frame, typically at the forward end of the base frame. The first support assembly 5 may be mounted on an interior surface of the base frame 7 such that it contacts the underside of the extendable frame 9, i.e. it supports the extendable frame from its underside. The support assembly 5 comprises a plurality of bearings 10 which facilitate movement of the extendable frame 9 relative to the base frame 7. In preferred embodiments each bearing 10 comprises a rotatable bearing, e.g. a roller, ball or wheel, but alternatively any other suitable bearing (rotatable or non-rotatable (e.g. part of a slide bearing)) may be used. The bearing 10 is carried by a support 13, which in preferred embodiments includes a coupling, e.g. comprising an axle (not shown) mounted between axle supports, for rotatably coupling the bearing 10 to the support 13.

The drive assembly 4 comprises a rotatable drive mechanism 20, typically comprising a sprocket, having a plurality of frame engaging portions 21, typically teeth, which are arranged to engage with a plurality of drive engaging portions 23, typically sockets or apertures, disposed upon the extendable frame 9 such that when the drive mechanism 20 rotates, the drive assembly 4 is configured to displace the extendable frames 9 with respect to the base frame 7 between an extended state and a retracted state. To this end, the frame engaging portions 21 are typically spaced apart around or towards the periphery of the drive mechanism 20. The drive engaging portions 23 are typically disposed in a substantially linear arrangement along at least a portion of the length of the extendable frame 9, typically upon the underside thereof, where "underside" is intended to mean the side of the frame which faces towards the ground surface upon which the conveyor apparatus 1 rests, in-use. The drive engaging portions 23 are configured to define a continuous arrangement in-use. The frame engaging portions 21 are disposed such as to align with the drive engaging portions 23 in-use. The drive engaging portions 23 may be integrally formed with respect to the extendable frame 9 or more preferably can be disposed upon a guide portion 24 which is attachable to the extendable frame 9. The drive engaging portions 23 are arranged to define a plurality of recesses or apertures spaced apart along the length, or substantially thereof, of the extendable frame 9 with the recesses being defined between respective drive engaging portions 23.

It is preferred that to facilitate controlled displacement of the extendable frame relative to the base frame that at least first and second drive assemblies 4 and first and second drive engaging portions 23 or first and second guide portions 24 comprising the drive engaging portions 23 are provided at opposing sides of the conveyor apparatus 1. It is also preferred for the, or each, drive assembly 4 to comprise a motor (not shown) or be coupled to a motor which is operable to rotate the drive mechanism 20 in either clockwise or anti-clockwise directions which may correspond to retracting or extending the extendable frame relative to the base frame or vice-versa in-use. Advantageously the continuous engagement arrangement provided by the drive mechanism 20 and the drive engaging portions 23 provides the conveyor apparatus 1 with a drive assembly 4 which is operable to provide reliable, controlled extension and retraction of the extendable frame relative to the base frame in-use.

In a first embodiment of the drive assembly as shown in FIGS. 1 to 4 the rotatable drive mechanism 20 may comprise first and second plates 22 which are disposed in a spaced apart arrangement, the first and second plates 22 typically have a substantially circular or disc like shape. The first and second plates 22 are connected by the plurality of frame engaging portions 21 which extend between the plates 22 such as to define a pin wheel. The spaced apart arrangement of the plates 22 define a gap therebetween which is suitable for receiving one or more of the drive engaging portions 23 as the drive mechanism 20 rotates in-use. In this embodiment the frame engaging portions 21 may comprise a plurality of pins or bars or rods or any other suitable elongate member which can engage with the drive engaging portions 21. In this embodiment the drive engaging portions 23 may comprise a plurality of teeth or other protrusions which are arranged such as to engage the elongate members comprising the frame engaging portions 21.

In a second embodiment of the drive assembly as shown in FIGS. 5 to 11 the rotatable drive mechanism 120 of the conveyor apparatus 101 may comprise a sprocket or cog 125 with the frame engaging portions 121 comprising a plurality of protrusions (or teeth) which extend from the body of the sprocket 125. For example where the sprocket 125 is substantially circular in shape, the protrusions may be disposed around the circumference of the sprocket 125. The drive engaging portions 123 may comprise a plurality of rods or pins or slots. Preferably the rods or slots are disposed upon the guide portion 124. The guide portion 124 may also comprise a chain, wherein the space between the respective links of the chain define the drive engaging portions 123 however it should be understood that the drive engaging portions 123 may comprise any arrangement which provides a plurality of recesses within which the frame engaging portions 121 may engage to facilitate movement of the extendable frame 9 relative to the base frame 7 in-use.

In a preferred embodiment, as shown in FIGS. 1 to 27, the drive assembly 4 is disposed upon the base frame 7 such that when the drive mechanism 20 rotates, the drive assembly 4 is configured to displace the extendable frame 9 with respect to the base frame 7 between an extended state and a retracted state. The drive engaging portions 23 are typically disposed in a linear arrangement substantially along the length of the extendable frame 9, ideally upon the underside of the extendable frame 9.

The base and/or extendable frames 7, 9 may be made of respective single parts however, preferably the base and/or extendable frames 7, 9 comprise a plurality of parts, or sections, which are coupled together end-to-end by one or more coupling device, preferably being releasably securable. As such the coupling means a securing arrangement 30, 130 such as to define the respective frames 7, 9. Preferably, at least the extendable frame 9 comprises multiple parts which are coupled together by the securing arrangement 30, 130 and which provides for the extendable frame 9 to be decoupled into separate multiple parts and reassembled as required, the extendable frame 9 advantageously thereby facilitating easy transportation and rapid deployment whilst also enabling greater adaptability of the extendable frame 9 as the length of the frame 9 may be made longer or shorter depending upon the desired requirements with the mere addition or removal of one of more parts of the frame 9. As such, the preferred frames 7, 9 (or either one of them) are modular, each part (such as parts 31, 32) of the frame being a respective frame module, wherein a plurality of frame modules can be coupled together, or decoupled, as desired in a modular fashion to create the respective frame 7, 9. The length of the frame 7, 9 is determined by the number of modules/parts that are connected together to create the whole frame. As such the modularity of the frame 7, 9, facilitates the creation of differently sized frames without have to design frames in a bespoke manner. The modularity also facilitates storage and transport. The frame modules may be identical, or substantially identical, to each other. Alternatively they may be of different lengths. It is preferred however that they are the same, or at least compatible in transverse cross section, to facilitate their interconnection and functionality as part of a conveyor.

The securing arrangement 30, 130 is configured such that when the plurality of parts of the respective frames 7, 9 are coupled together the drive engaging portions 23 are defined between respective parts of the frame 7, 109 or alternatively the securing arrangement 30, 130 may comprise the drive engaging portions 23 such that where the frame 9 is made up of multiple parts coupled together, the frame 9 comprises a continuous arrangement of drive engaging portions 23.

Optionally the securing arrangement 30 may comprise a pivotable coupling arrangement wherein the plurality of parts of the base and/or extendable frames 7, 9 are pivotably coupled to one another for pivoting about a transverse axis that is perpendicular to the longitudinal axis of the frame/conveyor (typically an in-use horizontal axis), at least in one more of operation. In particular, the coupling mechanism between adjacent frame parts may be configured to allow the adjacent frame parts to pivot relative to each other between a non-pivoted state in which the respective frame parts are longitudinally aligned with one another, and a pivoted state in which the respective longitudinal axis of the frame parts are obliquely disposed with respect to each other thereby making the frame/conveyor non-linear in the longitudinal direction, which may be said to create a curve or camber effect in the longitudinal shape of the frame/conveyor. In preferred embodiments, the inter-part couplings are configurable to allow the respective two coupled parts to pivot relative to one another in one mode, and to fix the respective parts together such that there is no pivoting between the two parts, in another mode. For example this may be achieved by providing the coupling mechanism with one or more locking device operable to selectably allow or prevent pivoting.

In some embodiments, the inter-part coupling mechanism may be configured to allow the respective frame parts to pivot under their own weight as the frame 9 extends. Optionally, the inter-part coupling may comprise one or more device for controlling and/or effecting movement of the respective frame parts between the pivoted and non-pivoted states. Such control device(s) may for example comprise any one or more of: one or more powered actuator, e.g. a hydraulic ram; one or more spring; and/or one or more movement restrictor (e.g. a chain or other linkage) coupled between the respective frame parts. For example, the powered actuator(s) may be operable to move the coupled frame parts between the pivoted and non-pivoted states. The spring(s) (or other resilient biasing means) may be arranged to allow the coupled parts to pivot but to urge them toward the non-pivoted state. The movement restrictor(s) may limit the extent to which the coupled frame parts can pivot with respect to each other, thereby controlling the curvature of the conveyor.

In the illustrated embodiment, where the securing arrangement 30 comprises a pivotable coupling arrangement the extendable frame 9 may be configured such that when the extendable frame 9 adopts the extended state, one or more parts of the extendable frame 9 may be arranged to pivot relative to one or more other parts of the extendable frame 9 such that the extendable frame 9 may assume a substantially arcuate or cambered configuration, for example as shown in FIGS. 33, 35, 36 and 38. Advantageously by providing an arcuate or cambered (i.e. non-linear in the longitudinal direction) extendable frame 9, material carried by the conveyor apparatus 1 will have a reduced drop from the end of the extendable frame compared to a straight frame. Furthermore if the conveyor apparatus 1 is being used to convey materials onto a ship or other structure located at a height above the ground surface upon which the conveyor apparatus 1 rests in-use the material carried thereon may be more accurately deposited upon the ship or structure.

Figure 12:
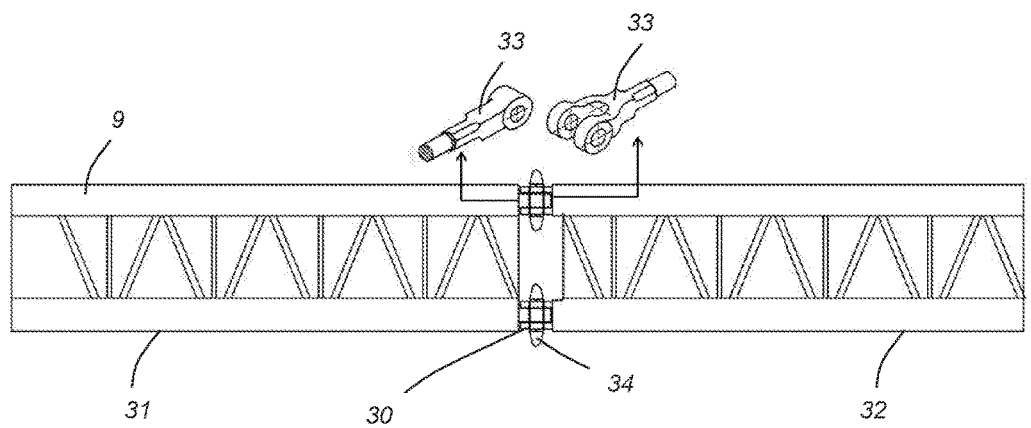
FIG. 12 is a side sectional view of an alternative embodiment of the conveyor apparatus showing a first embodiment of a securing arrangement between respective parts of the apparatus.
Figure 13:
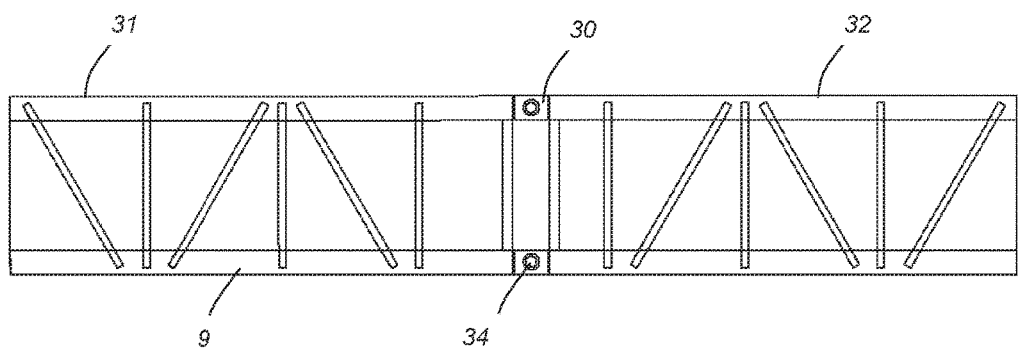
FIG. 13 is a bottom plan view of the alternative embodiment of the conveyor apparatus showing the first embodiment of the securing arrangement between respective parts of the apparatus.
Figure 14:
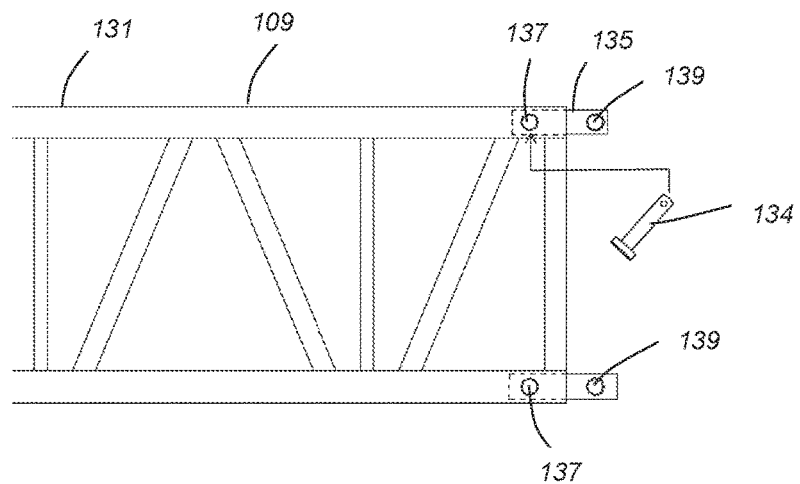
FIG. 14 is a side view of a further alternative embodiment of the conveyor apparatus showing a second embodiment of the securing arrangement between respective parts of the apparatus.
Figure 15:
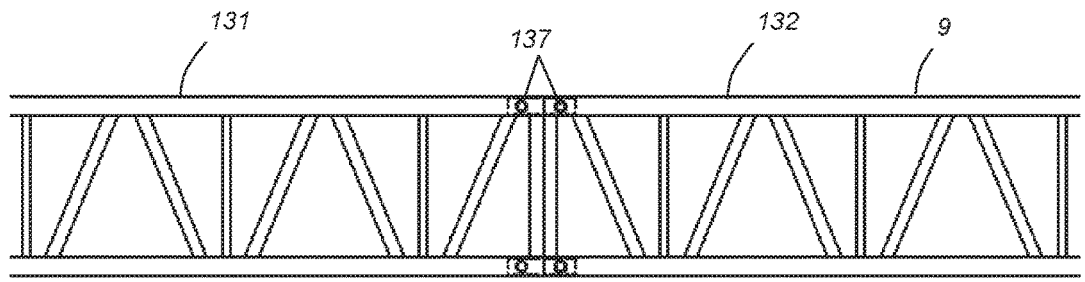
FIG. 15 is a side view of the further alternative embodiment of the conveyor apparatus showing the second embodiment of the securing arrangement between respective parts of the apparatus.
Figure 16:
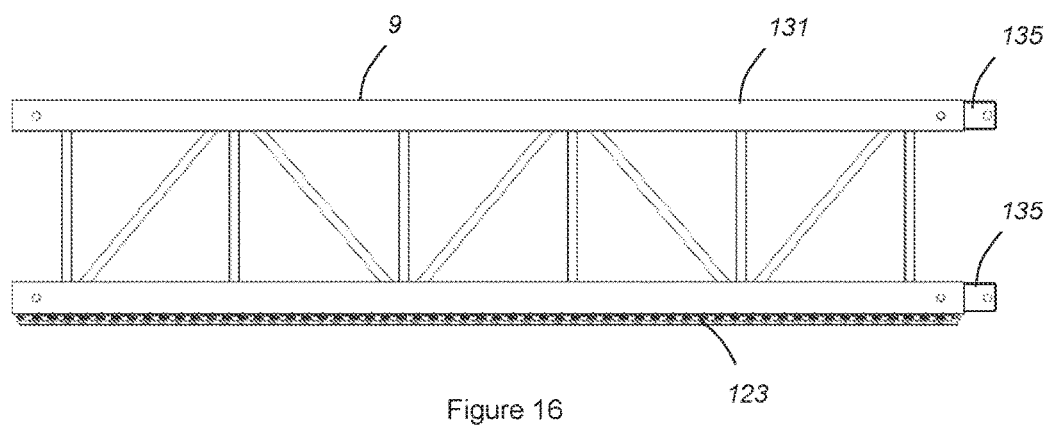
FIG. 16 is a side view of a first part of the conveyor apparatus.
Figure 17:
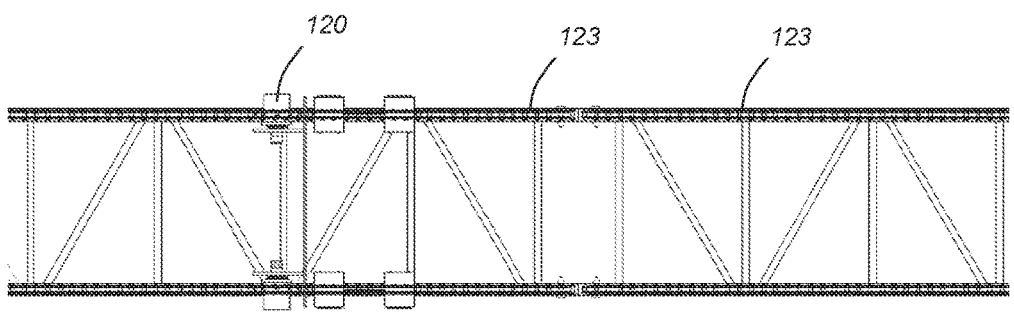
FIG. 17 is a top plan view of the further alternative embodiment of the conveyor apparatus.
Figure 18:
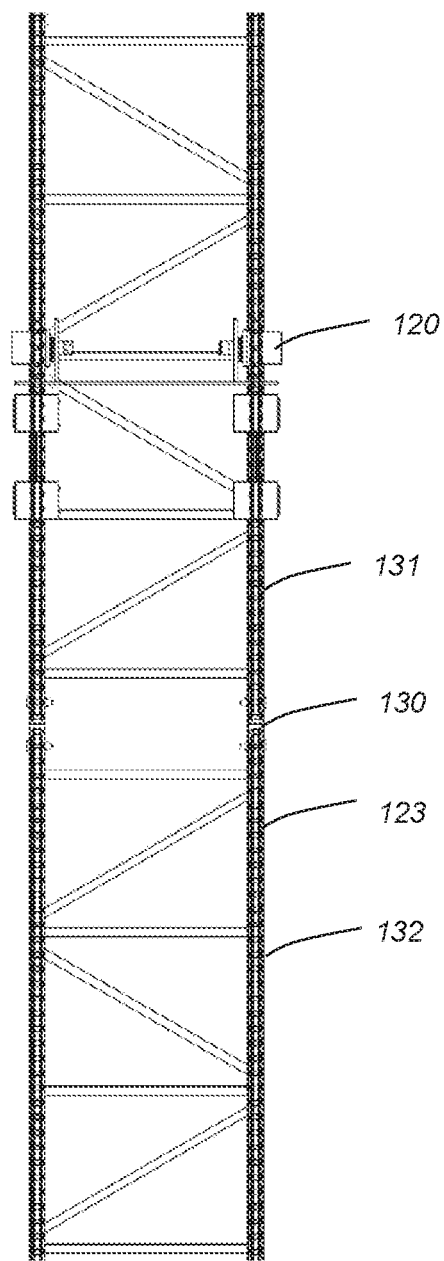
FIG. 18 is a top plan view of the further alternative embodiment of the conveyor apparatus.
Figure 19:
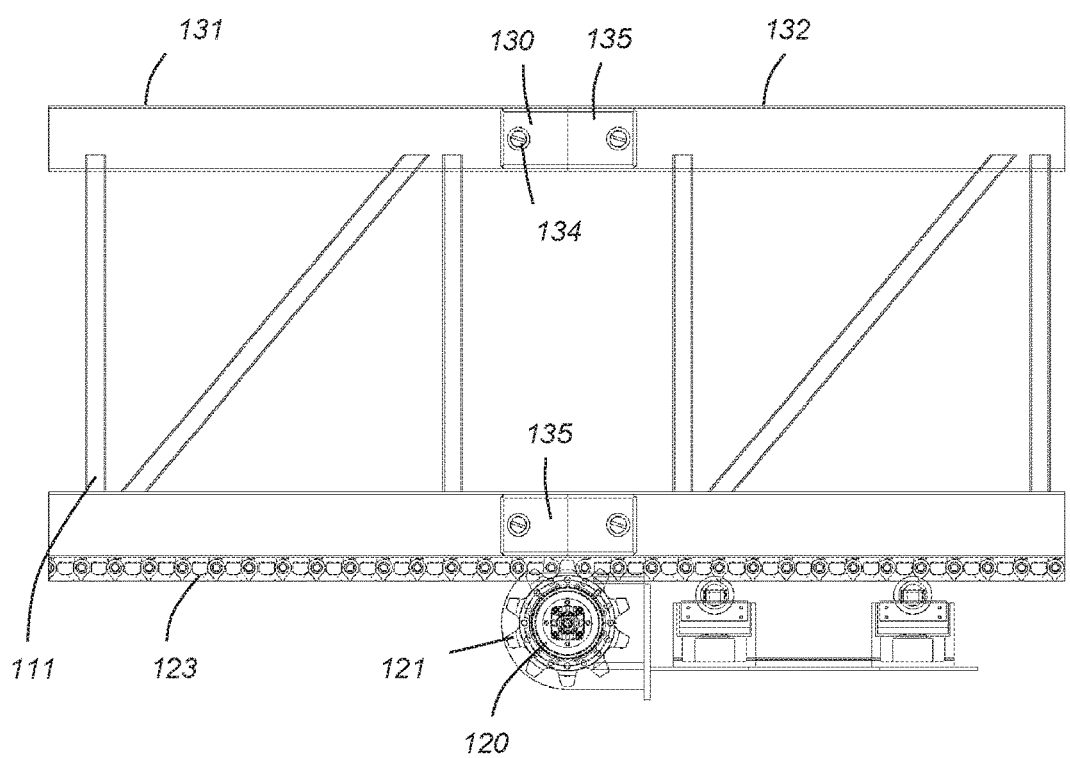
FIG. 19 is a side sectional view of the further alternative embodiment of the conveyor apparatus showing the second embodiment of the securing arrangement.
Figure 20:
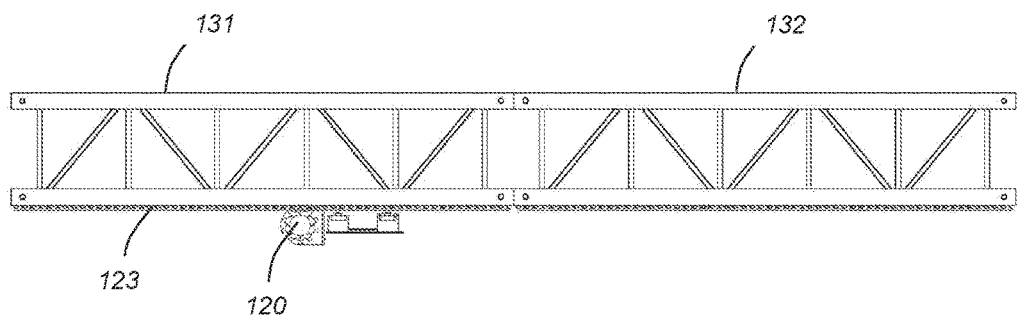
FIG. 20 is a side plan view of the further alternative embodiment of the conveyor apparatus showing the second embodiment of the securing arrangement.

A first embodiment of the securing arrangement 30 is shown in FIGS. 12 and 13, where first and second parts 31, 32 of the extendable frame 9 are shown coupled together by the securing arrangement 30. For reasons of clarity other elements of the apparatus 1 have been excised however it should be understood that the extendable frame 9 or its modularity is not intended to be limited to first and second parts 31, 32 only. In this embodiment the securing arrangement 30 comprises corresponding female and male portions 33, 34 which are operable to couple together to secure the parts 31, 32 together.

At least two securing arrangements 30 are typically provided to secure first and second parts 31, 32 together. However it is preferred that at least four securing arrangements 30 are provided when securing first and second parts 31, 32 together with a securing arrangement 30 being located at the upper and lower corners of the ends of the parts 31, 32.

For example each of the parts 31, 32 of the extendable frame 9 typically have the securing arrangement 30 typically comprising at least two female portions 33 disposed thereon, the female portion(s) 33 of one part 31 being alignable with the female portion(s) 33 of the other part 32 such that when the female portions 33 of two parts are aligned they are arranged to define an aperture (not shown) into which a male member 34 may be inserted such as to couple the two parts of the extendable frame 9 together. The male members 34 may be secured within the aperture by a retaining ring (not shown) such as a c-clip. Preferably the female portions 33 of the securing arrangement 30 are arranged such that they define an aperture which extends substantially perpendicular to the vertical axis in-use. Ideally each part 31, 32 of the extendable frame 9 comprises four female portions 33 located at each end of that part 31, typically at the upper and lower corners thereof, however where the part 31, 32 comprises an end part of the frame 9 the part 31, 32 may have only four female portions 33 located at one end. Preferably the four female portions 33 are disposed such that they extend from the end(s) of the part(s) in forward and rearward directions therefrom, typically from upper and lower locations of the part(s) 31.

Advantageously, when two parts 31, 32 are coupled together by the securing arrangement 30, the securing arrangement 30 is configured to define a drive engaging portion 23 which is alignable with the drive engaging portions 23 disposed upon the part 31 such that when the plurality of parts 31 are coupled together such as to define the extendable frame 9, the parts 31 and plurality of securing arrangements 30 define drive engaging portions 23 which extend in continuous fashion along opposing sides of the extendable frame 9. The drive engaging portions 123 may be defined as the recess(es) between respective parts 31, 32 which the frame engaging portions 121 of the rotatable drive mechanism 120 may engage when the parts 31, 32 are secured by the securing arrangement 30. Alternatively the securing arrangement 30 may comprise one or more drive engaging portions 123 for example, the securing arrangement 30 may have a plurality of recesses or indentations disposed in a spaced apart arrangement, typically along its length, within which the frame engaging portions 121 of the rotatable drive mechanism 120 may engage. The securing arrangement 30 may comprise a clevis joint such as a knuckle joint including fork and eye knuckle joints or any other suitable coupling arrangement.

The securing arrangement 30 may comprise a pivotable coupling arrangement as described previously, where the one or more parts of the extendable frame 9 are typically arranged to pivot relative to one or more other parts of the extendable frame 9 such that the extendable frame 9 may assume a substantially arcuate or cambered configuration such that the conveyor apparatus comprises a cambered boom conveyor as shown in FIGS. 33 to 38.

For example the parts 31, 32 may be coupled by a plurality of securing arrangements 30, typically four securing arrangements 30, located at or towards the respective upper and lower end corners of the parts 31, 32. When in the retracted state the extendable frame 9 comprising the plurality of parts 31, 32 are typically guided and supported by the base frame 7 such that the extendable frame 9 adopts a substantially straight configuration. Upon displacement of the extendable frame 9 relative to the base frame 7, such that the extendable frame 9 adopts the extended state, the plurality of parts 31, 32 may be configured to sequentially bend relative to one another as they displace out of and away from the confines of the base frame 7 such that the extendable frame 9 assumes a substantially arcuate or cambered configuration when in the extended state. Preferably the lower securing arrangements 30A comprise pivotable coupling arrangements, the lower securing arrangements being those securing arrangements 30 located nearest to the ground surface upon which the conveyor apparatus rests in-use, comprise permanent couplings in-use to secure the parts 31, 32 together whilst the upper securing arrangements 30B are releasable. At least one actuator 40 is preferably disposed between each part 31, 32, typically between upper ends of the parts 31, 32, wherein the actuator 40 is configured to urge the parts 31, 32 to pivot about a pivot axis defined by the pivotable coupling of the lower securing arrangements 30A such that when the extendable frame 9 adopts the extended state the extendable frame is substantially arcuate in shape in the cambered configuration. The pivot axis should be understood as the axis extending perpendicular to the forward and rear directions. The upper securing arrangement 30B preferably includes a distance limiter (not shown) configured to prevent the parts 31, 32 from pivoting relative to one another beyond a predetermined distance. The distance limiter may comprise a pin and slot arrangement or one or more linkages or arms or any other arrangement suitable for preventing the displacement of the parts 31, 32 beyond the predetermined distance from one another. The actuator(s) 40 may comprise a resilient biasing means such as a spring e.g. high tension spring or a powered actuator such as a hydraulic, pneumatic or electrical actuator.

The upper securing arrangements 30B may be secured prior to or after the extendable frame 9 adopts the retracted state. The upper securing arrangements 30B may be unsecured sequentially by an operator as the extendable frame 9 displaces out of and away from the base frame 7 or may be unsecured whilst the extendable frame is located within the base frame 7. The plurality of parts 31, 32 of the extendable frame 9 are coupled together by both lower and upper securing arrangements 30A, 30B with the upper securing arrangements 30B typically being releasable typically remotely so by wired or wireless electronic means. Advantageously, where the upper securing arrangement is remotely releasable the extendable frame 9 may be varied between the substantially straight configuration and the cambered configuration when it has adopted the extended state in-use. Optionally a limited number of parts 31, 32 making up the extendable frame 9 may be arranged to pivot such that in the extended state the extendable frame 9 comprises a substantially straight section and a substantially arcuate section (not shown). In an alternative embodiment (not shown) the upper securing arrangement 30B may comprise a powered actuator such as a hydraulic, pneumatic or electrical actuator disposed between the parts which is configured to extend such as to pivot the parts about the pivot axis of the lower securing arrangement 30A comprising the pivotable coupling arrangement e.g. clevis joint. Advantageously, where the upper securing arrangement 30B comprises a powered actuator, the actuator may be configured to restrict the displacement of the parts 31, 32 beyond a predetermined distance from one another. Further advantageously where the upper securing arrangement 30B comprises a powered actuator the actuator may be varied between retracted and extended states corresponding to straight and cambered configurations.

A second embodiment of the securing arrangement 130 is shown in FIGS. 14 to 27, where first and second parts 131, 132 of the extendable frame 109 are shown coupled together by the securing arrangement 130. In this embodiment the securing arrangement 130 comprises a plurality of joining portions 135, wherein each joining portion is configured to be insertable into the two parts 131, 132 of the frame 109 the same joining portion 135 being insertable into both of the first and second parts 131, 132 of the frame 109 at the same time. The frame 109 and its respective parts 131, 132 comprise the hollow lattice of interconnected support members 111 described previously. The support members 111 have openings (not shown) disposed at the ends of each part 131, 132 typically provided at the corners of each part 131, 132 into which one of the joining portions 135 can be inserted, in part, such that when the joining portion 135 is inserted into the first part 131 the remainder of the joining portion 135 may be inserted into the second part 132. The joining portions 135 are shaped such as to be insertable within the support members 111, making up the frame 109 for example where the support members 111 are substantially rectangular in shape the joining portions 135 will be substantially rectangular also. The parts 131, 132 have primary apertures 137 located on their lateral faces, typically at the ends of each part 131, 132 whilst the joining portions 135 have secondary apertures 139 located on their lateral faces such that when the joining portions 135 are inserted into the parts 131, 132 the primary and secondary apertures 137, 139 of the parts 131, 132 and joining portions 135 are configured to align such that a male member 134 such as a pin or bar or screw or other male member may be inserted into the aligned primary and secondary apertures 137, 139 such as to secure the joining portion 135 within the first and/or second part 131, 132.

Figure 21:
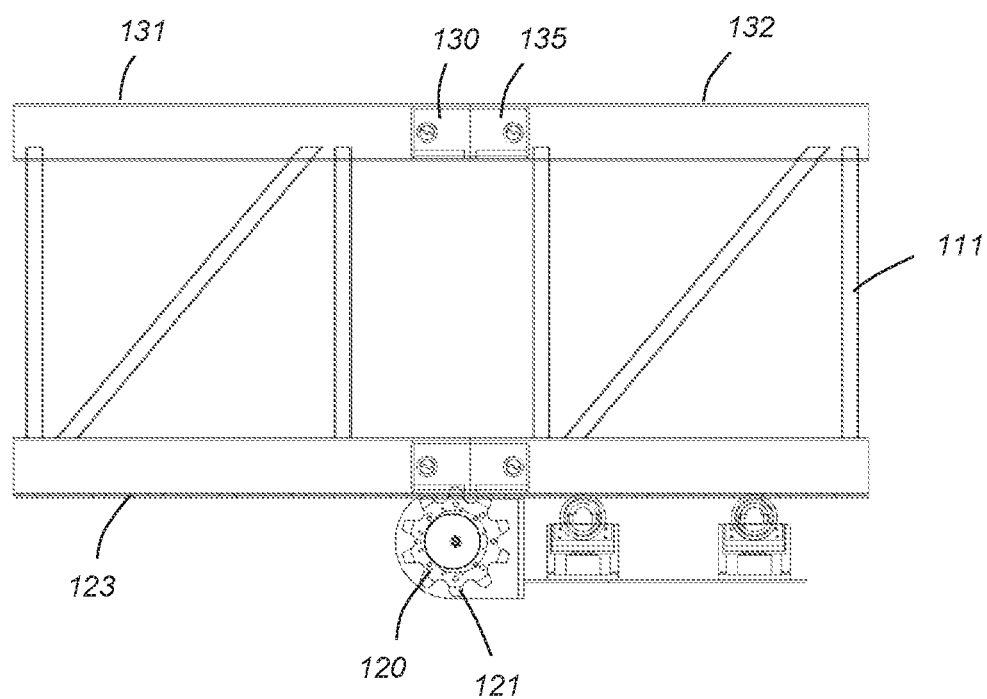
FIG. 21 is a side sectional view of the further alternative embodiment of the conveyor apparatus showing the second embodiment of the securing arrangement.
Figure 22:
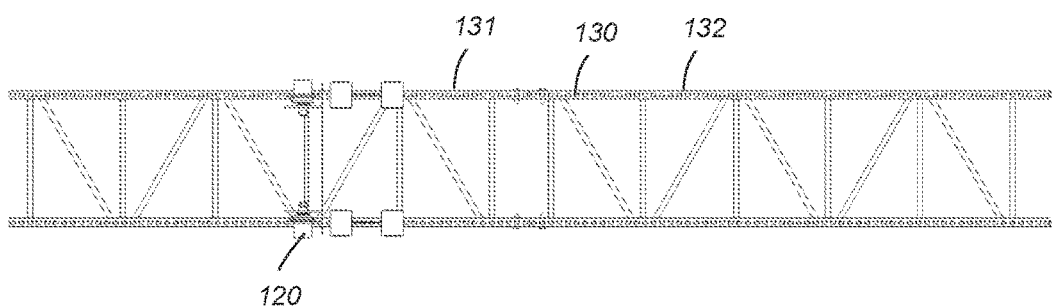
FIG. 22 is a top plan view of the further alternative embodiment of the conveyor apparatus.
Figure 23:
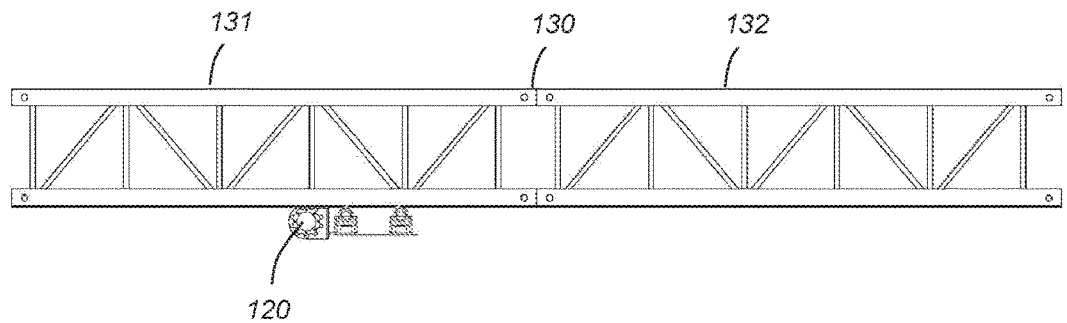
FIG. 23 is a side plan view of the further alternative embodiment of the conveyor apparatus.
Figure 24:
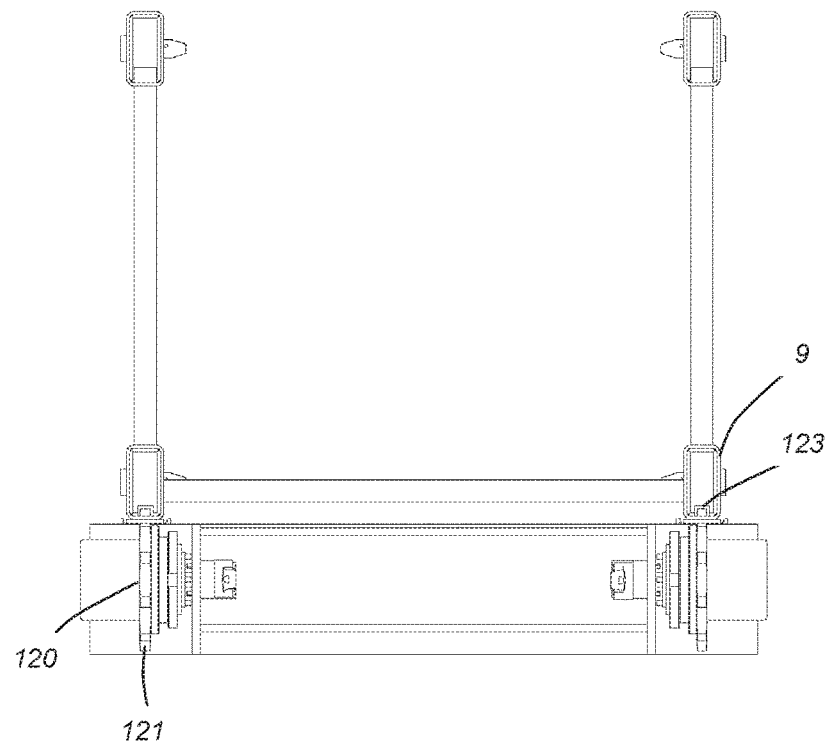
FIG. 24 is a front sectional view of the further alternative embodiment of the conveyor apparatus.
Figure 25:
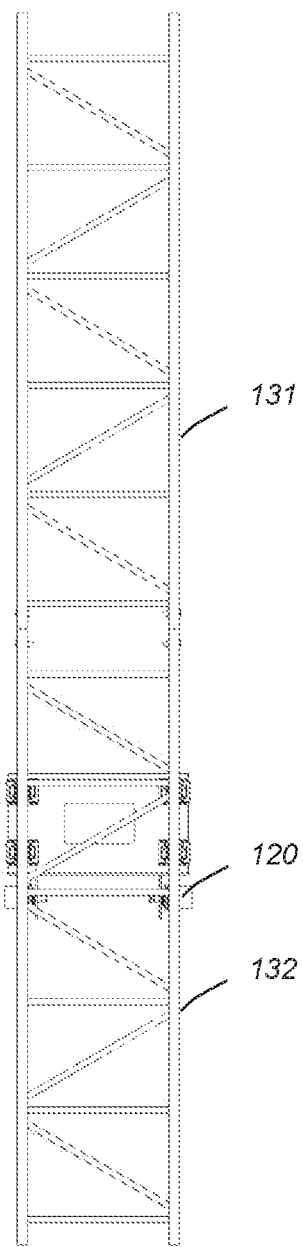
FIG. 25 is a top plan view a top plan view of the further alternative embodiment of the conveyor apparatus.
Figure 26:
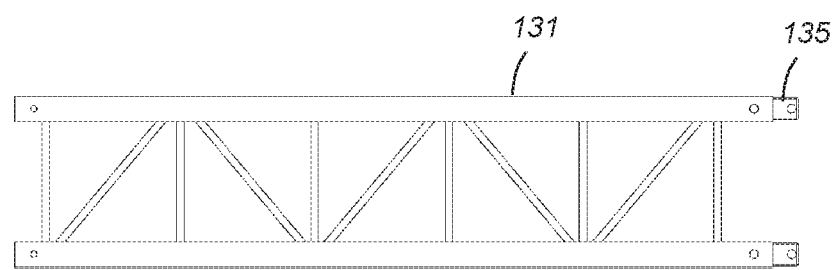
FIG. 26 is a side view of a part of the conveyor apparatus.
Figure 27:
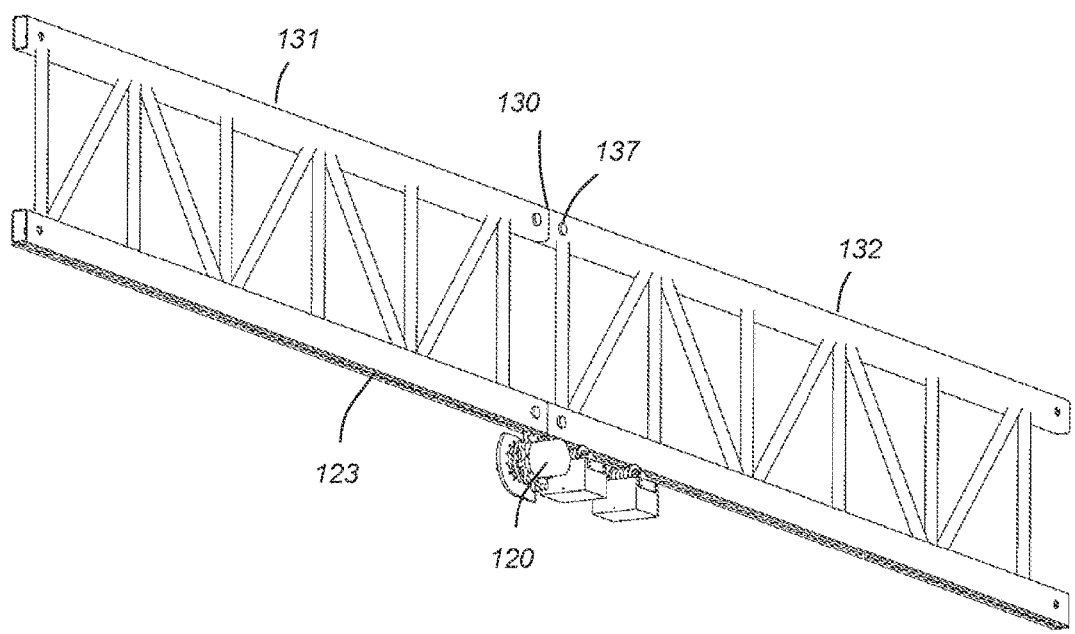
FIG. 27 is a perspective view of the further alternative embodiment of the conveyor apparatus.
Figure 28:
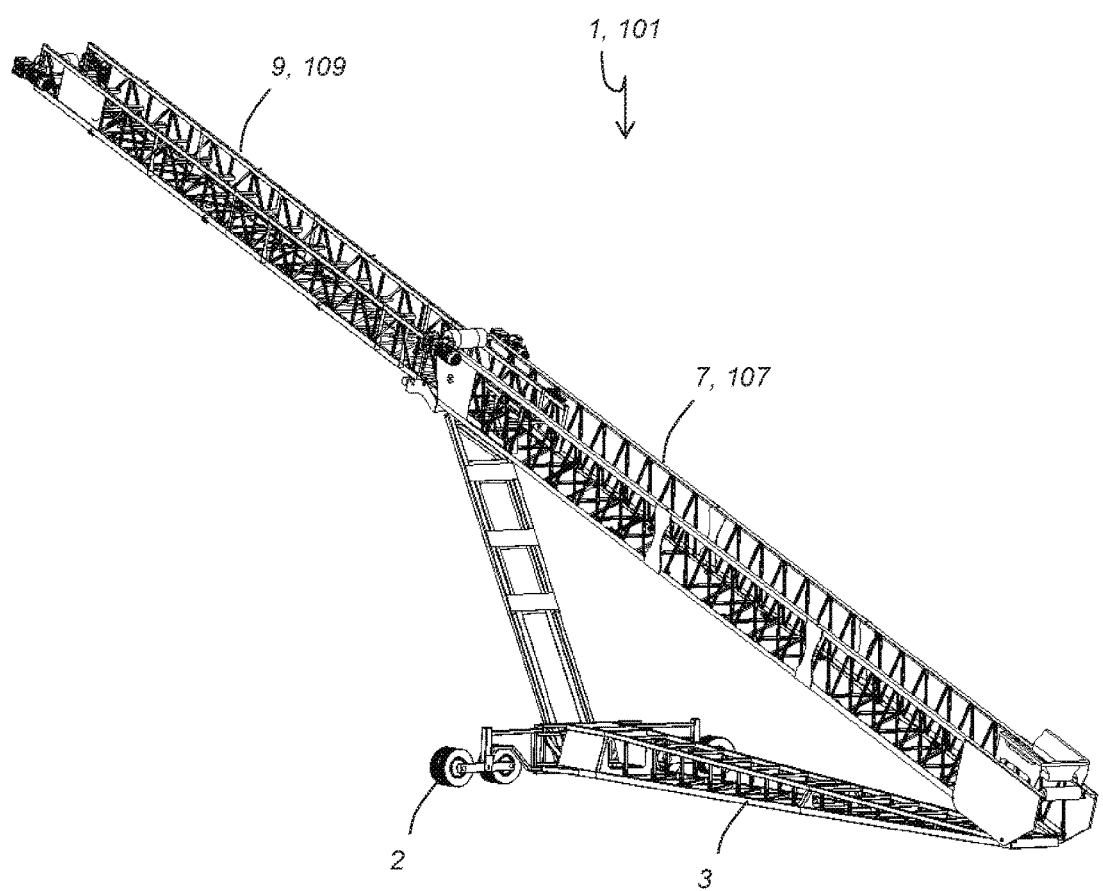
FIG. 28 is a side perspective view of the conveyor apparatus in an extended state.
Figure 29:
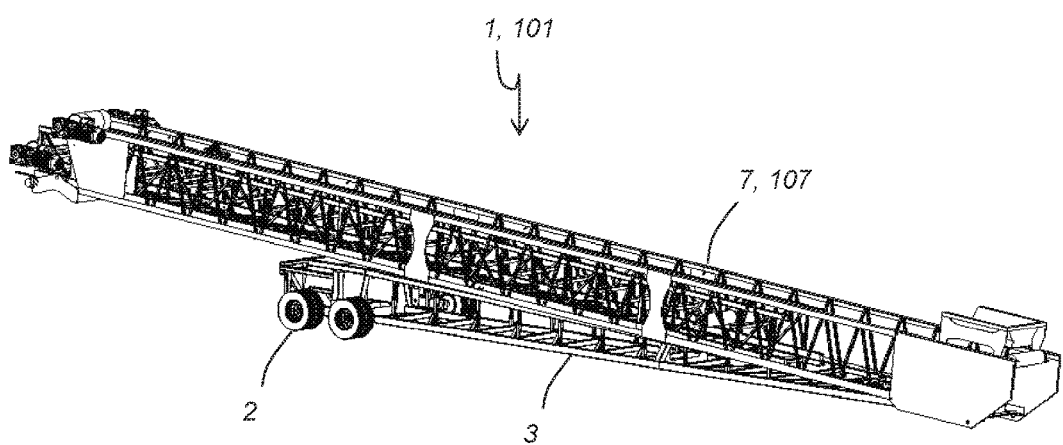
FIG. 29 is a side perspective view of the conveyor apparatus in a retracted state.
Figure 30:
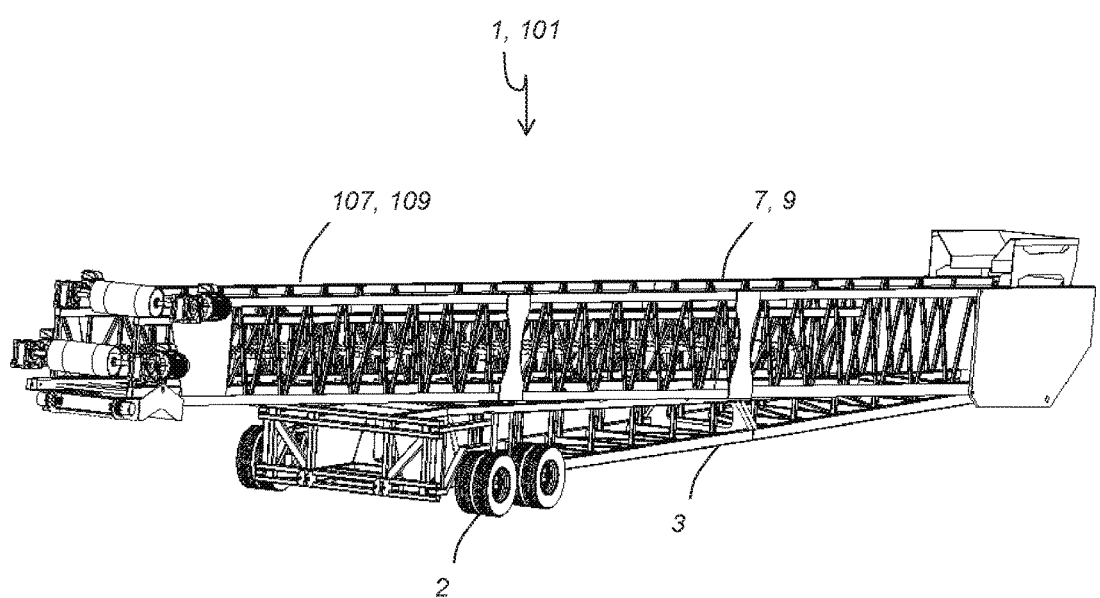
FIG. 30 is a front perspective view of the conveyor apparatus in the retracted state.
Figure 31:
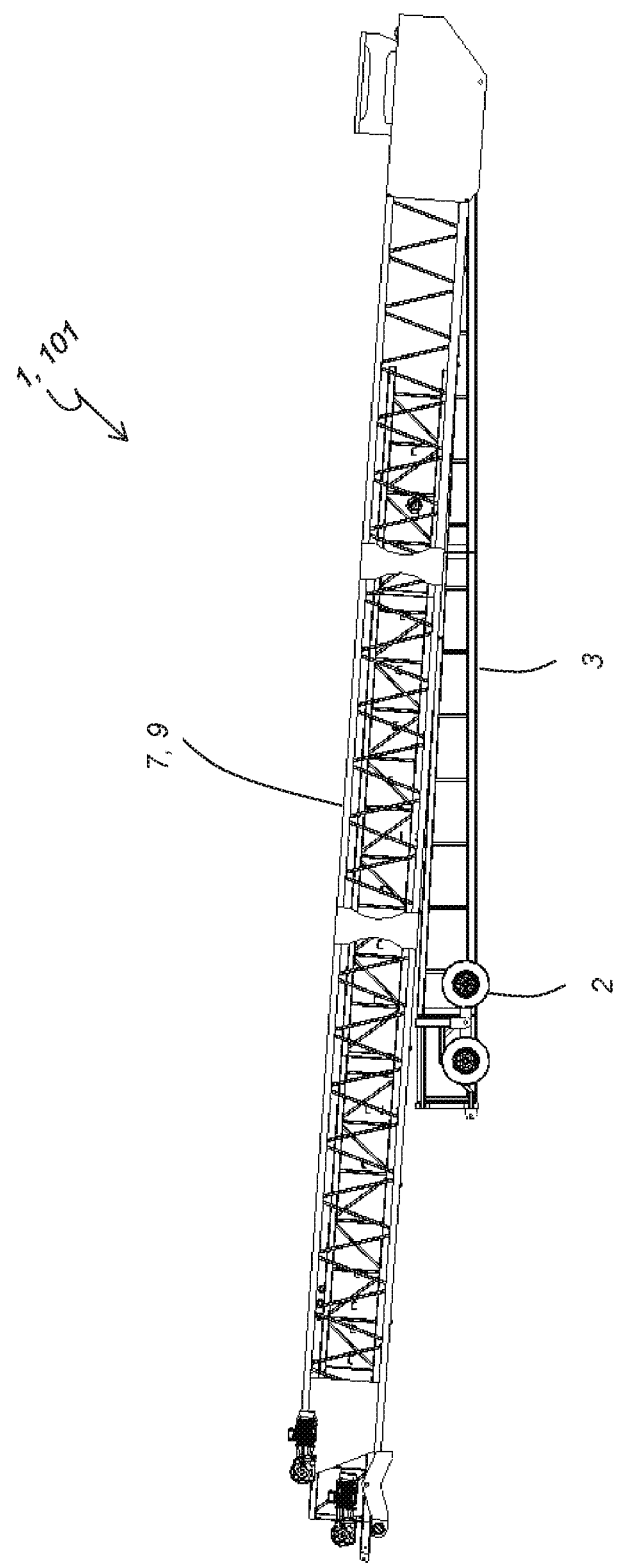
FIG. 31 is a side view of the conveyor apparatus in the retracted state.
Figure 32:
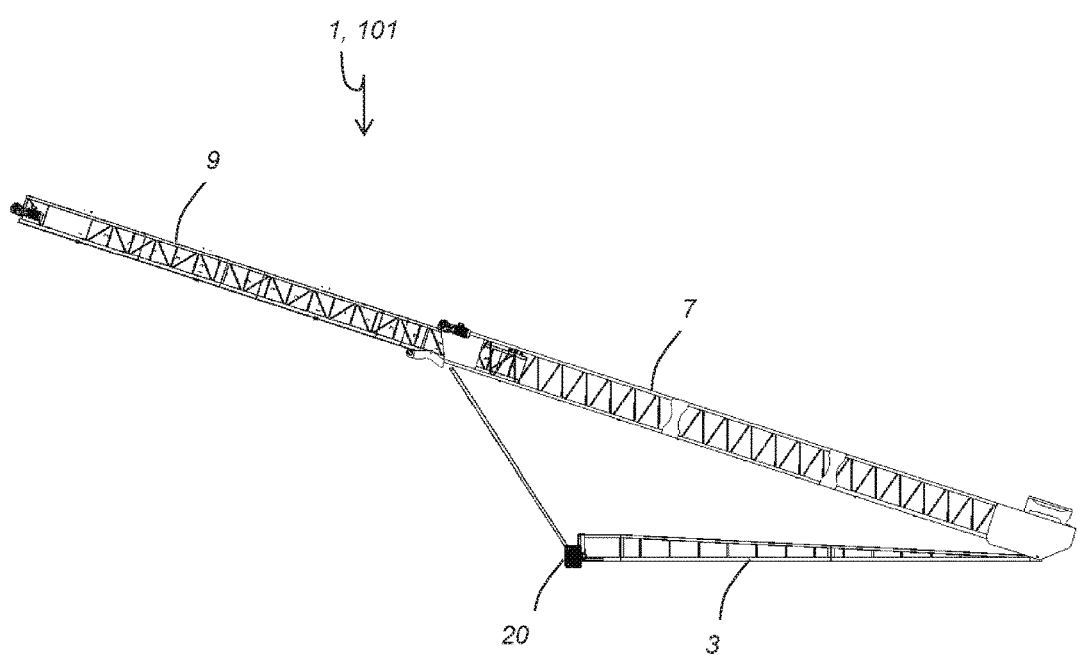
FIG. 32 is a side view of the conveyor apparatus in the extended state.
Figure 33:
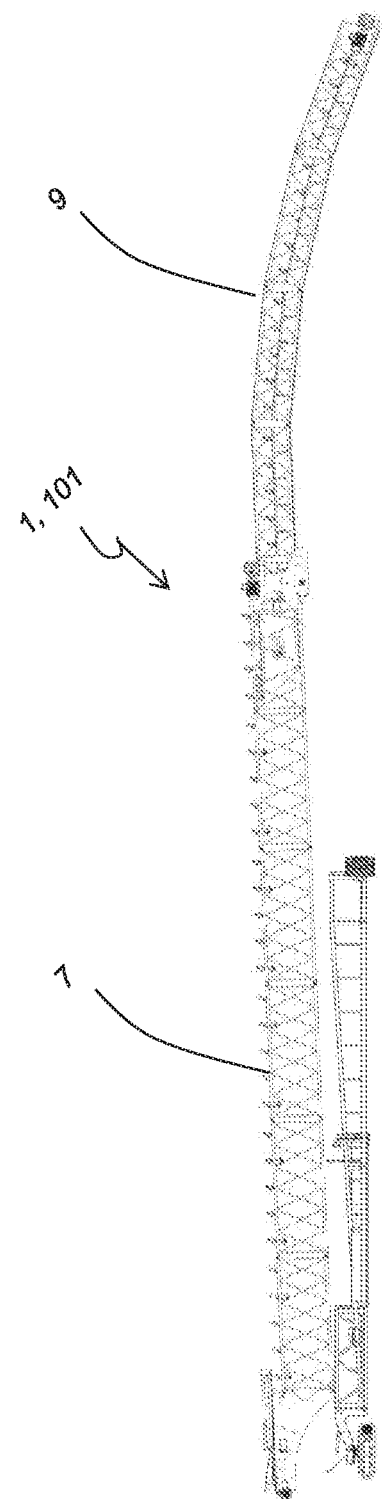
FIG. 33 is a side view of the conveyor apparatus in the extended state and cambered configuration.
Figure 34:
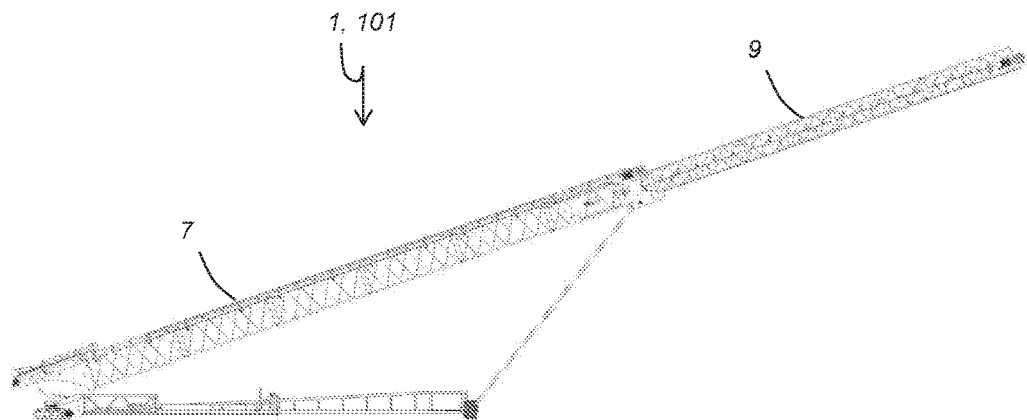
FIG. 34 is a side view of the conveyor apparatus in the extended state and straight configuration.
Figure 35:
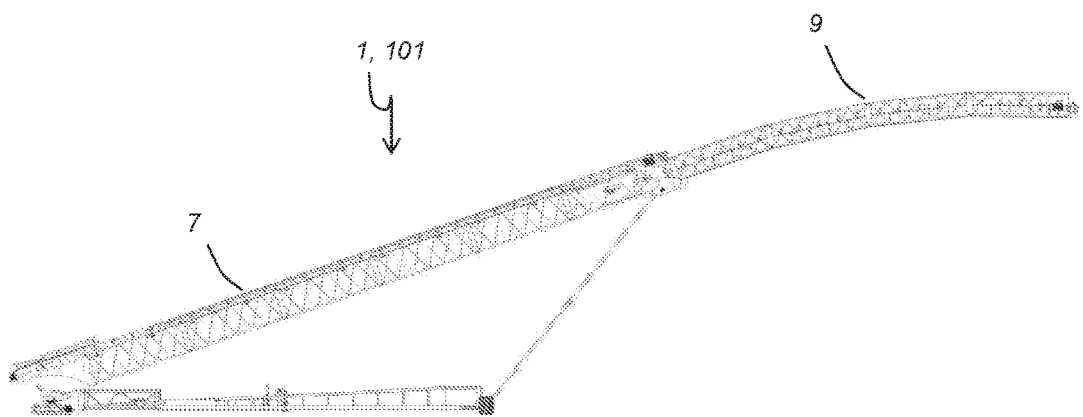
FIG. 35 is a side view of the conveyor apparatus in the extended state and cambered configuration.
Figure 36:
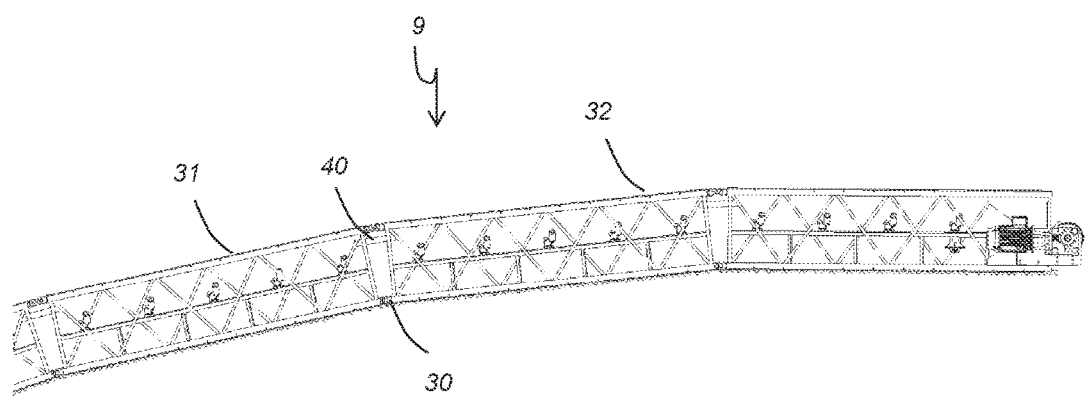
FIG. 36 is a side view of the conveyor apparatus in the extended state and cambered configuration showing the securing arrangements comprising a pivotable coupling arrangement.
Figure 37:
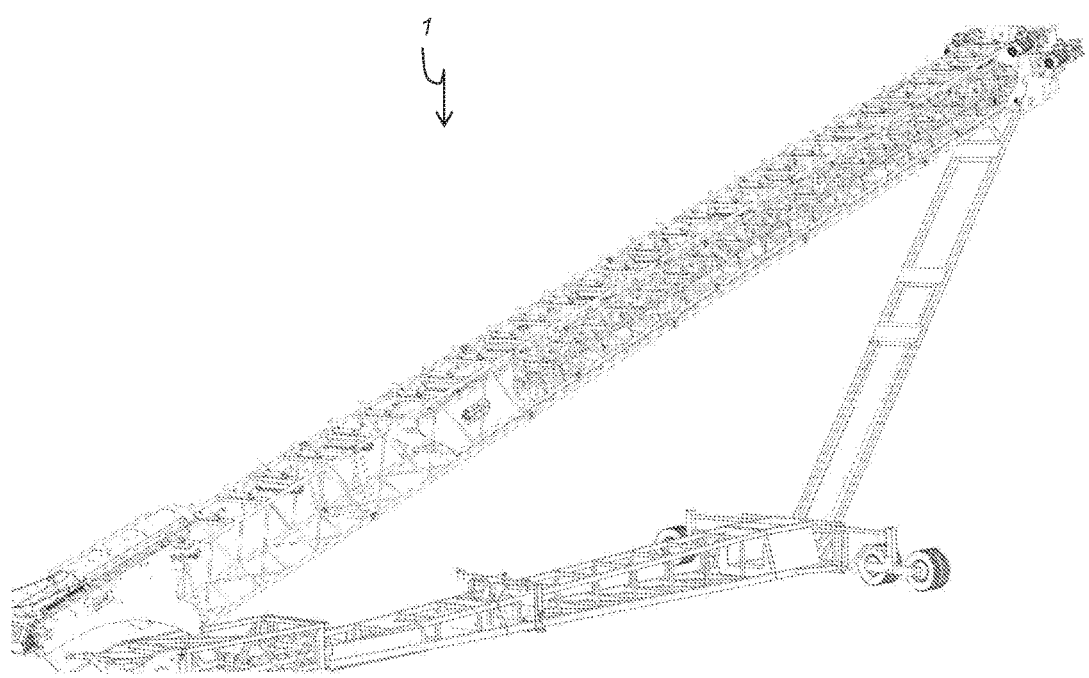
FIG. 37 is a perspective view of the conveyor apparatus in the retracted state.
Figure 38:
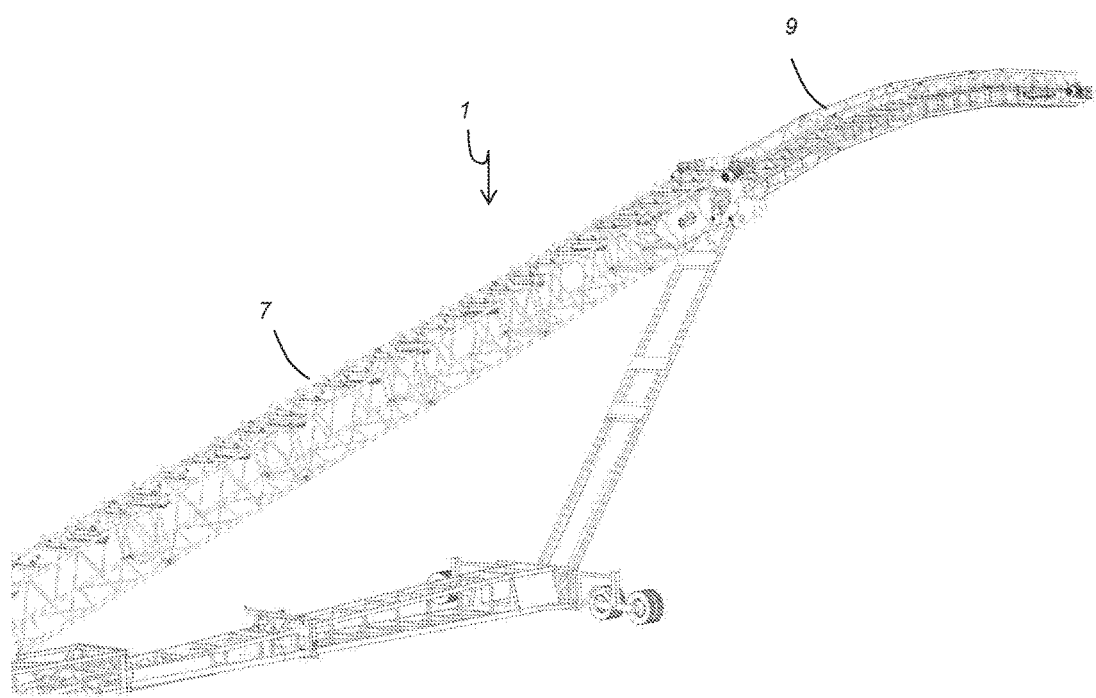
FIG. 38 is a perspective view of the conveyor apparatus in the extended state and cambered configuration.

The primary and secondary apertures 137, 139 are arranged such that when they align a section of the joining portion 135 extends out of and away from the first part 131, advantageously this section of the joining portion 135 which extends out of the part 131 may be inserted into a respective other part such as the second part 132, with secondary apertures 139 of the joining portion 135 aligning with primary apertures 137 disposed on the second part 132 such that the joining 135 may be secured to the second part 132 in the same fashion as the first part 131. Advantageously, when the joining portion 135 is secured within two parts 131, said parts 131, 132 are coupled together. It should be understood that the frame 109 comprises multiple parts and that the use of the terms first and second parts 131, 132 is used for illustrative purposes only and is not intended to limit the number of parts unnecessarily. Further advantageously, when the first and second parts 131, 132 are secured together by the joining portion 135 the joining portion 135 ideally includes a cavity or recess formed along substantially all or at least part of its length typically upon the underside thereof, such that when the joining portion 135 is located inside both of the first and second parts 131 and 133 there is a substantially flush coupling between the respective parts 131, 132 the drive engaging portions 123 disposed upon the parts 131, 132, typically upon the underside, may align with the cavity of the joining portion 135 form a continuous arrangement with the frame engaging portions 121 of the drive mechanism 120 being receivable in the drive engaging portions 123 and the cavity of the joining portion 135 as shown in FIG. 21. Alternatively where the drive engaging portions 123 comprise a chain as described in embodiments previously this may be secured to or otherwise coupled to the coupled parts 131, 132 such as to form a continuous arrangement of drive engaging portions 123.

Preferably the support members 111 located at the ends of each of the parts 131, 132, typically at each opposing side, at upper and lower locations, typically include at least two primary apertures 137 located on opposing lateral sides of each support member 111, with each joining portion 135 having at least four secondary apertures 139, with two being disposed on each opposing lateral side thereof such that one joining portion 135 may be secured within two support members 111, one of the first part 131 and one of the second part 132 such as to secure the two parts 131, 132 together. Typically each part 131 132 will comprise four end support members 111 such that four joining portions 135 may be used to couple first and second parts 131, 132.

In-use the conveyor apparatus 1, 101 may be moved into a desired location for displacing material, whereupon the extendable frame 9, 109 may be displaced relative to the base frame 7, 107 from the retracted state to the extended state by the drive assembly 4 and in particular by the rotational movement of the drive mechanism 20, 120 having the plurality of frame engaging portions 21, 121 which are arranged to engage with the plurality of drive engaging portions 23, 123 disposed upon the extendable frame 9, 109. In an alternative embodiment the plurality of parts 131, 132 may be transported to the desired location and secured together by the securing arrangement 30, 130 to define the base and/or extendable frames 7, 107, 9, 109. Advantageously by assembling the conveyor apparatus 1, 101 at the desired location of use, the apparatus 1, 101 can be more readily transported and the securing arrangement 30, 130 providing for a fast and efficient means of assembly of the frames 7, 107, 9, 109 in-use.

The invention is not limited to the embodiment(s) described herein but can be amended or modified without departing from the scope of the present invention.

The invention claimed is:

1. A conveyor apparatus comprising:
a base frame and an extendable frame, wherein the extendable frame is supported by, and within, the base frame;
a drive assembly;
wherein the drive assembly comprises a rotatable drive mechanism having a plurality of frame engaging portions which are arranged to engage with a plurality of drive engaging portions provided on a first one of the base or extendable frames so that when the rotatable drive mechanism rotates, the drive assembly is configured to displace the first one of the base or extendable frames with respect to a second one of the base or extendable frames between an extended state and a retracted state;
wherein the plurality of drive engaging portions comprise a plurality of formations; and
wherein the rotatable drive mechanism comprises first and second sprockets that are spaced apart to define a gap therebetween which is suitable for receiving one or more of the plurality of drive engaging portions, connected by the plurality of frame engaging portions which extend between the first and second sprockets.

2. The conveyor apparatus as claimed in claim 1, wherein the plurality of drive engaging portions are disposed in a linear arrangement along at least a portion of the length of a first frame comprising the base or extendable frames to define a continuous arrangement of drive engaging portions.

3. The conveyor apparatus as claimed in claim 1, wherein the plurality of drive engaging portions are provided on the extendable frame; and/or wherein the plurality of drive engaging portions are provided on an underside of the extendable frame.

4. The conveyor apparatus as claimed in claim 1, wherein the plurality of drive engaging portions comprise a plurality of spaced apart recesses.

5. The conveyor apparatus as claimed claim 1, wherein the plurality of formations comprise pins or bars or slots.

6. The conveyor apparatus as claimed in claim 1, wherein the plurality of frame engaging portions are spaced apart around, or adjacent, a periphery of the drive mechanism.

7. The conveyor apparatus as claimed in claim 1, wherein the plurality of frame engaging portions comprise a plurality of pins or bars or any other suitable elongate member or formation.

8. The conveyor apparatus as claimed in claim 6, wherein the plurality of frame engaging portions comprise a plurality of protrusions so that the rotatable drive mechanism defines a sprocket.

9. The conveyor apparatus as claimed in claim 1, wherein the conveyor apparatus comprises first and second drive assemblies arranged at opposing sides of the base frame.

10. The conveyor apparatus of claim 9, wherein the conveyor apparatus comprises first and second arrangements of drive engaging portions disposed at opposing sides of the base frame, the first and second arrangements of drive engaging portions arranged to engage with respective first and second drive assemblies.

11. The conveyor apparatus as claimed in claim 1, wherein the base frame and/or extendable frame comprise a plurality of parts, or modules, which are coupled together by a securing arrangement, wherein the locations at which the plurality of parts are coupled together define a plurality of joints.

12. The conveyor apparatus as claimed in claim 11, wherein the securing arrangement is configured so that when the plurality of parts of the frames are coupled together the plurality of joints between respective parts define a drive engaging portion so that where the parts are coupled, the coupled parts define a continuous arrangement of drive engaging portions.

13. The conveyor apparatus as claimed in claim 11, wherein the securing arrangement comprises at least two female portions disposed upon different parts of the base frame or extendable frame, the female portion of one part being alignable with the female portion of at least one other part so that when the female portions of any two parts are aligned they are arranged to define an aperture into which a male member is insertable such as to couple the respective two parts of the frame together.

14. The conveyor apparatus as claimed in claim 13, wherein when any two parts are coupled together by the securing arrangement, the coupled female portions are configured to define a drive engaging portion which is alignable with the drive engaging portions disposed upon the parts so that when the plurality of parts are coupled together to define the base frame or extendable frame, the parts and plurality of securing arrangements define drive engaging portions which extend in continuous fashion along opposing sides of the base frame or extendable frame.

15. The conveyor apparatus as claimed in claim 11, wherein the securing arrangement comprises a plurality of joining portions, wherein each joining portion is configured to be insertable into two parts of the base frame or extendable frame with the same joining portion being insertable into both first and second parts of the base frame or extendable frame at the same time.

16. The conveyor apparatus as claimed in claim 15, wherein the parts of the base frame or extendable frame have openings disposed at their ends into which one joining portion is insertable into each opening in part so that when the joining portion is inserted into a first part of the base frame or extendable frame a remainder of the joining portion is insertable into a second part of the base frame or extendable frame.

17. The conveyor apparatus as claimed in claim 15, wherein the parts of the base frame or extendable frame have primary apertures located on their lateral faces and the joining portions have secondary apertures located on their lateral faces so that when the joining portions are inserted into the parts the primary and secondary apertures of the parts and joining portions respectively are configured to align so that a male member can be inserted into the aligned apertures such as to secure the joining portion within the part with a remainder of the joining portion extending out of and away from the part for insertion in a respective other part of the base frame or extendable frame for coupling the part and the respective other part together.

18. A drive assembly for a conveyor apparatus having a base frame and an extendable frame, the extendable frame having a plurality of drive engaging portions disposed thereon, the drive assembly comprising:

a rotatable drive mechanism having a plurality of frame engaging portions which are arranged to engage with the plurality of drive engaging portions provided on the extendable frame so that when the rotatable drive mechanism rotates, the drive assembly is configured to displace the extendable frame with respect to the base frame between an extended state and a retracted state;

wherein the plurality of drive engaging portions comprise a plurality of formations; and wherein the rotatable drive mechanism comprises first and second spaced sprockets that are spaced apart to define a gap therebetween which is suitable for receiving one or more of the plurality of drive engaging portions, connected by the plurality of frame engaging portions which extend between the first and second sprockets.

19. A conveyor apparatus comprising;

a base frame and an extendable frame, wherein the extendable frame is supported by, and within, the base frame;

a drive assembly comprising a rotatable drive mechanism having a plurality of frame engaging portions which are arranged to engage with a plurality of drive engaging portions provided on the extendable frame so that when the drive mechanism rotates, the drive assembly is configured to displace the extendable frame with respect to the base frame between an extended state and a retracted state;

wherein the extendable frame comprises a plurality of parts, or modules, which are pivotably coupled together; and wherein the extendable frame is configured so that when the extendable frame adopts the extended state the one or more parts of the extendable frame are configurable to pivot relative to one or more other parts of the extendable frame so that the extendable frame assumes a substantially curved configuration.

\* \* \* \* \*

UNITED STATES PATENT AND TRADEMARK OFFICE
CERTIFICATE OF CORRECTION

PATENT NO. : 10,538,391 B2  
APPLICATION NO. : 15/989420  
DATED : January 21, 2020  
INVENTOR(S) : Bratton Page 1 of 1

It is certified that error appears in the above-identified patent and that said Letters Patent is hereby corrected as shown below:

On the Title Page

The Assignee reads:  
"(73) Assignee: TEREX BG LIMITED (GB)"  
Should read:  
--(73) Assignee: TEREX GB LIMITED (GB)--

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*